US012597280B2

(12) United States Patent (10) Patent No.: US 12,597,280 B2
Chae (45) Date of Patent: Apr. 7, 2026

(54) IMAGE PROCESSING SYSTEM, IMAGE PROCESSING METHOD, AND PROGRAM

(71) Applicant: RAKUTEN GROUP, INC., Tokyo (JP)

(72) Inventor: Yeongnam Chae, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 383 days.

(21) Appl. No.: 17/800,891

(22) PCT Filed: Jul. 28, 2021

(86) PCT No.: PCT/JP2021/027961
§ 371 (c)(1),
(2) Date: Aug. 18, 2022

(87) PCT Pub. No.: WO2023/007631
PCT Pub. Date: Feb. 2, 2023

(65) Prior Publication Data
US 2024/0193974 A1     Jun. 13, 2024

(51) Int. Cl.
*G06V 30/19*          (2022.01)
*G06T 7/00*           (2017.01)
(Continued)

(52) U.S. Cl.
CPC ...... *G06V 30/19013* (2022.01); *G06T 7/0002* (2013.01); *G06V 30/18019* (2022.01); (Continued)

(58) Field of Classification Search
CPC .. G06V 10/759; G06V 10/809; G06V 10/993; G06V 10/247; G06V 30/414; (Continued)

(56) References Cited

U.S. PATENT DOCUMENTS 10,262,220 B1 *   4/2019   Pribble ............... G06V 10/242
10,936,866 B2 *   3/2021   Berger ............... G07D 7/2008
(Continued)

FOREIGN PATENT DOCUMENTS

EP          3786844 A1     3/2021
JP        2004318423 A    11/2004
(Continued)

OTHER PUBLICATIONS

Castelblanco, A, et al. Machine Learning Techniques for Identity Document Verification in Uncontrolled Environments: A Case Study, MCPR 2020. Lecture Notes in Computer Science(), vol. 12088. Springer, Cham. https://doi.org/10.1007/978-3-030-49076-8_26 (Year: 2020).*
(Continued)

*Primary Examiner* — Chan S Park
*Assistant Examiner* — Paulo Andres Garcia
(74) *Attorney, Agent, or Firm* — HEA Law PLLC

(57) ABSTRACT

At least one processor of an image processing system acquires a target object image including a target object. The at least one processor executes matching for the target object image based on a template image including a feature about the target object. The at least one processor analyzes a plurality of scores acquired through the matching. The at least one processor determines, based on a result of analysis of the plurality of scores, whether the target object in the target object image is blurred.

17 Claims, 16 Drawing Sheets

(51) Int. Cl.
*G06V 30/18* (2022.01)
*G06V 30/42* (2022.01)

(52) U.S. Cl.
CPC .... *G06V 30/42* (2022.01); *G06T 2207/30168* (2013.01); *G06T 2207/30176* (2013.01)

(58) Field of Classification Search
CPC ....... G06V 30/19013; G06V 30/18019; G06V 30/42; G06T 7/00; G06T 7/0002; G06T 7/74; G06T 2207/20061; G06T 2207/20076; G06T 2207/30176; G06T 2207/30168; G06Q 20/4014
See application file for complete search history.

(56) References Cited

U.S. PATENT DOCUMENTS

| | | | |
|---|---|---|---|
| 2004/0207881 A1 | 10/2004 | Nomura | |
| 2010/0172579 A1* | 7/2010 | Reid | G06V 40/161 |
| | | | 382/199 |
| 2011/0229043 A1* | 9/2011 | Kuraki | G06T 5/10 |
| | | | 382/218 |
| 2013/0022293 A1 | 1/2013 | Yamazoe | |
| 2013/0155474 A1 | 6/2013 | Roach et al. | |
| 2015/0086088 A1* | 3/2015 | King | G06V 40/30 |
| | | | 382/118 |
| 2017/0344824 A1* | 11/2017 | Martin | G06V 10/993 |
| 2021/0209393 A1 | 7/2021 | Chae | |
| 2021/0248368 A1* | 8/2021 | Jarvis | G06V 10/17 |
| 2021/0374933 A1* | 12/2021 | Neeman | H04N 1/00838 |

FOREIGN PATENT DOCUMENTS

| | | |
|---|---|---|
| JP | 2013026936 A | 2/2013 |
| JP | 2014-164574 A | 9/2014 |
| JP | 2017156920 A | 9/2017 |
| JP | 2019519844 A | 7/2019 |
| JP | 6574920 B1 * | 9/2019 ........ G06V 30/1475 |
| JP | 2020-177368 A | 10/2020 |
| WO | WO-2017205547 A1 * | 11/2017 ........ G06K 9/00463 |
| WO | 2020008628 A1 | 1/2020 |
| WO | 2021049234 A1 | 3/2021 |

OTHER PUBLICATIONS

Sanchez-Rivero, Ruben, Silva, Francisco, Morales-Gonzalez, Annette. Capture of identity document images in the wild: detection and quality assessment,https://www.researchgate.net/publication/362171450_Captura_de_documentos_de_identidad_en_escenarios_reales_Deteccion_y_evaluacion_de_la_calida (Year: 2020).*
N. Ghanmi and A. M. Awal, "A New Descriptor for Pattern Matching: Application to Identity Document Verification," 2018 13th IAPR International Workshop on Document Analysis Systems (DAS), Vienna, Austria, 2018, pp. 375-380, doi: 10.1109/DAS.2018.74. (Year: 2018).*
G. Chiron, N. Ghanmi and A. M. Awal, "ID documents matching and localization with multi-hypothesis constraints, " 2020 25th International Conference on Pattern Recognition (ICPR), Milan, Italy, 2021, pp. 3644-3651, doi: 10.1109/ICPR48806.2021.9412437. (Year: 2020).*
S .- R. Kodituwakku and S. Selvarajah "Comparison of color features for image retrieval". In Indian Journal of Computer Science and Engineering 1.3 (2004), pp. 207-211. (Year: 2004).*
Shaharyar Ahmed Khan Tareen, Zahra Saleem, "A comparative analysis of SIFT, SURF, KAZE, AKAZE, ORB, and BRISK", 2018 International Conference on Computing, Mathematics and Engineering Technologies, https://ieeexplore.ieee.org/document/8346440, pp. 1-10.
International Search Report of Oct. 19, 2021, for International Application No. PCT/JP2021/027961 pp. 1-10.
Search Report of Dec. 1, 2023, for corresponding EP Patent Application No. 21925104.8, pp. 1-10.
Search Report of Feb. 28, 2023, for related EP Patent Application No. 21925105.5, pp. 1-8.

* cited by examiner

PHOTOGRAPH DRIVER'S
LICENSE TO ACQUIRE
PHOTOGRAPHED IMAGE

DETECT LINE SEGMENTS FROM
PHOTOGRAPHED IMAGE

LEAVE LINE SEGMENTS THAT ARE,
AT BOTH ENDS, WITHIN
PREDETERMINED DISTANCE
FROM EDGE PARTS OF REGION
OF INTEREST

FOR EACH EDGE PART OF REGION
OF INTEREST, LEAVE
OUTERMOST LINE SEGMENT

EXTEND LINE SEGMENTS TO
ACQUIRE CORNER INFORMATION

PHOTOGRAPHED IMAGE IN
WHICH CORNER IS LOCATED
OUTSIDE REGION OF INTEREST
IS NOT USED

ACQUIRE CORNER INFORMATION
OF DRIVER'S LICENSE OF
EXEMPLAR IMAGE

PROCESS PHOTOGRAPHED IMAGE
SO THAT POSITIONAL
RELATIONSHIP OF CORNERS IN
PHOTOGRAPHED IMAGE MATCH
ONE IN EXEMPLAR IMAGE

IMAGE PROCESSING SYSTEM, IMAGE PROCESSING METHOD, AND PROGRAM

CROSS REFERENCE TO RELATED APPLICATIONS

This application is a National Stage of International Application No. PCT/JP2021/027961 filed on Jul. 28, 2021. The contents of the above document is incorporated herein by reference in its entirety.

TECHNICAL FIELD

The present disclosure relates to an image processing system, an image processing method, and a program.

BACKGROUND ART

Hitherto, there has been known a technology for determining, by image processing, whether a target object in a target object image is blurred. In Non-Patent Literature 1, there is described a technology for determining the degree of matching between a target object image and a template image by matching a group of feature points of the target object image and a group of feature points of the template image. When a target object image includes the same target object as the one in a template image but has a low degree of matching, the target object in the target object image may be blurred.

CITATION LIST

Non Patent Literature

[NPL 1] Shaharyar Ahmed Khan Tareen, Zahra Saleem, "A comparative analysis of SIFT, SURF, KAZE, AKAZE, ORB, and BRISK," 2018 International Conference on Computing, Mathematics and Engineering Technologies, https://ieeexplore.ieee.org/document/8346440

SUMMARY OF INVENTION

Technical Problem

However, the technology of Non-Patent Literature 1 requires extraction of a large number of feature points included in a target object image, and may accordingly increase a processing load on a computer that executes image processing. For example, when a group of feature points is extracted from target object images sequentially generated by a camera of a smartphone to determine whether the target object is blurred, a processing load on the smartphone increases. The same applies to computers other than smartphones.

An object of the present disclosure is to lighten a processing load on a computer.

Solution to Problem

According to one embodiment of the present disclosure, there is provided an image processing system including: image acquisition means for acquiring a target object image including a target object; matching execution means for executing matching for the target object image based on a template image including a feature about the target object; analysis means for analyzing a plurality of scores acquired through the matching; and blurring determination means for determining, based on a result of analysis of the plurality of scores, whether the target object in the target object image is blurred.

Advantageous Effects of Invention

According to the present disclosure, a processing load on the computer can be lightened.

DESCRIPTION OF EMBODIMENTS

1. Overall Configuration of Image Processing System

Figure 1:
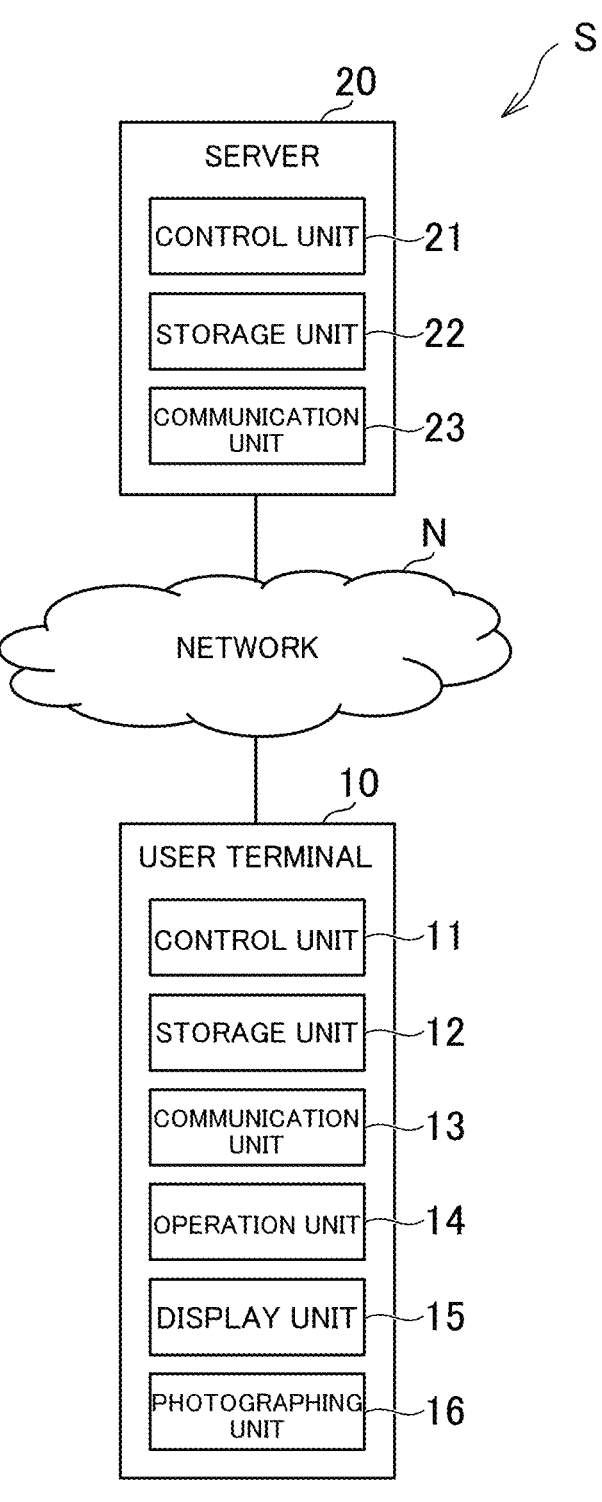
FIG. 1 is a diagram for illustrating an example of an overall configuration of an image processing system.

An example of an embodiment of an image processing system according to the present disclosure is described below. FIG. 1 is a diagram for illustrating an example of an overall configuration of the image processing system. An image processing system S includes a user terminal 10 and a server 20. The user terminal 10 and the server 20 are connectable to a network N, which is the Internet, a LAN, or the like. It is sufficient for the image processing system S to include at least one computer, and the image processing system S is not limited to the example of FIG. 1.

The user terminal 10 is a computer of a user. For example, the user terminal 10 is a smartphone, a tablet terminal, a personal computer, or a wearable terminal. A control unit 11 includes at least one processor. A storage unit 12 includes a volatile memory that is a RAM or the like and a non-volatile memory that is a hard disk drive or the like. A communication unit 13 includes at least one of a communication interface for wired connection or a communication interface for wireless communication. An operation unit 14 is an input device such as a touch panel. A display unit 15 is a liquid crystal display or an organic EL display. A photographing unit 16 includes at least one camera.

The server 20 is a server computer. A control unit 21, a storage unit 22, and a communication unit 23 may have the same physical configurations as the physical configurations of the control unit 11, the storage unit 12, and the communication unit 13, respectively.

Programs or data stored in the storage units 12 and 22 may be supplied via the network N. The server 20 or the user terminal 10 may include a reading unit (for example, an optical disc drive or a memory card slot) for reading a computer-readable information storage medium, or an input/ output unit (for example, a USB port) for data input from/ output to an external device. For example, a program or data stored on an information storage medium may be supplied via the reading unit or the input/output unit.

2. Outline of Image Processing System

This embodiment takes as an example a case of applying the image processing system S to electronic Know Your Customer (ekYC), which is identity verification executed online. Any service can use ekYC. For example, ekYC is usable in a communication service, a financial service, an electronic settlement service, an insurance service, or a government service. Execution of ekYC can be at any timing. For example, ekYC is executed at the time of, or after, signing up for a service.

In ekYC, an identity verification document (identity document) of a user is checked. The identity verification document can be of any type, and is, for example, a driver's license, an insurance card, a residence certificate, a personal identification number card, a passport, or a similar document. The description of this embodiment takes a driver's license as an example of a user's identity verification document. Accordingly, "driver's license" in the description can be read as an identity verification document.

The user operates the user terminal 10 to photograph the driver's license with the photographing unit 16, and uploads a photographed image to the server 20. When the photographed image is uploaded to the server 20, ekYC is executed. The execution of ekYC may be automatic with the use of image processing such as optical character recognition, or may be visual recognition of the photographed image by an administrator of the service. The execution of ekYC may also include both of the image processing and the visual recognition by the administrator.

In this embodiment, a case in which the user is demanded to photograph the driver's license from a frontal direction is described. However, various publicly known methods are usable in ekYC itself. For example, the user may be demanded to photograph the driver's license tilted so that the driver's license is in a predetermined posture, or may be demanded to move the driver's license around. Other examples include a case in which the user is demanded to photograph both of the user's face and the driver's license, and a case in which the user is demanded to wink or perform some movement.

For example, when the driver's license in the photographed image uploaded by the user is distorted, the validity of the driver's license cannot be checked. Thus, the user terminal 10 executes image processing for processing the photographed image so that the driver's license is straightforward. As this type of image processing, image processing using groups of feature points is known. However, the image processing using groups of feature points is large in the amount of calculation and accordingly increases a processing load on the user terminal 10. The user terminal 10 in this embodiment lightens the processing load by a first configuration in which image processing using line segments instead of groups of feature points is executed.

To give another example, the validity of the driver's license cannot be checked also when the driver's license in the photographed image uploaded by the user is blurred. Thus, the user terminal 10 executes image processing for determining whether the driver's license is blurred. The image processing using groups of feature points is known also as this type of image processing. However, the image processing using groups of feature points is large in the amount of calculation and accordingly increases the processing load on the user terminal 10. The user terminal 10 in this embodiment lightens the processing load by a second configuration in which image processing using matching instead of groups of feature points is executed. Details of the first configuration and the second configuration are described below.

3. Functions Implemented in Image Processing System

Figure 2:
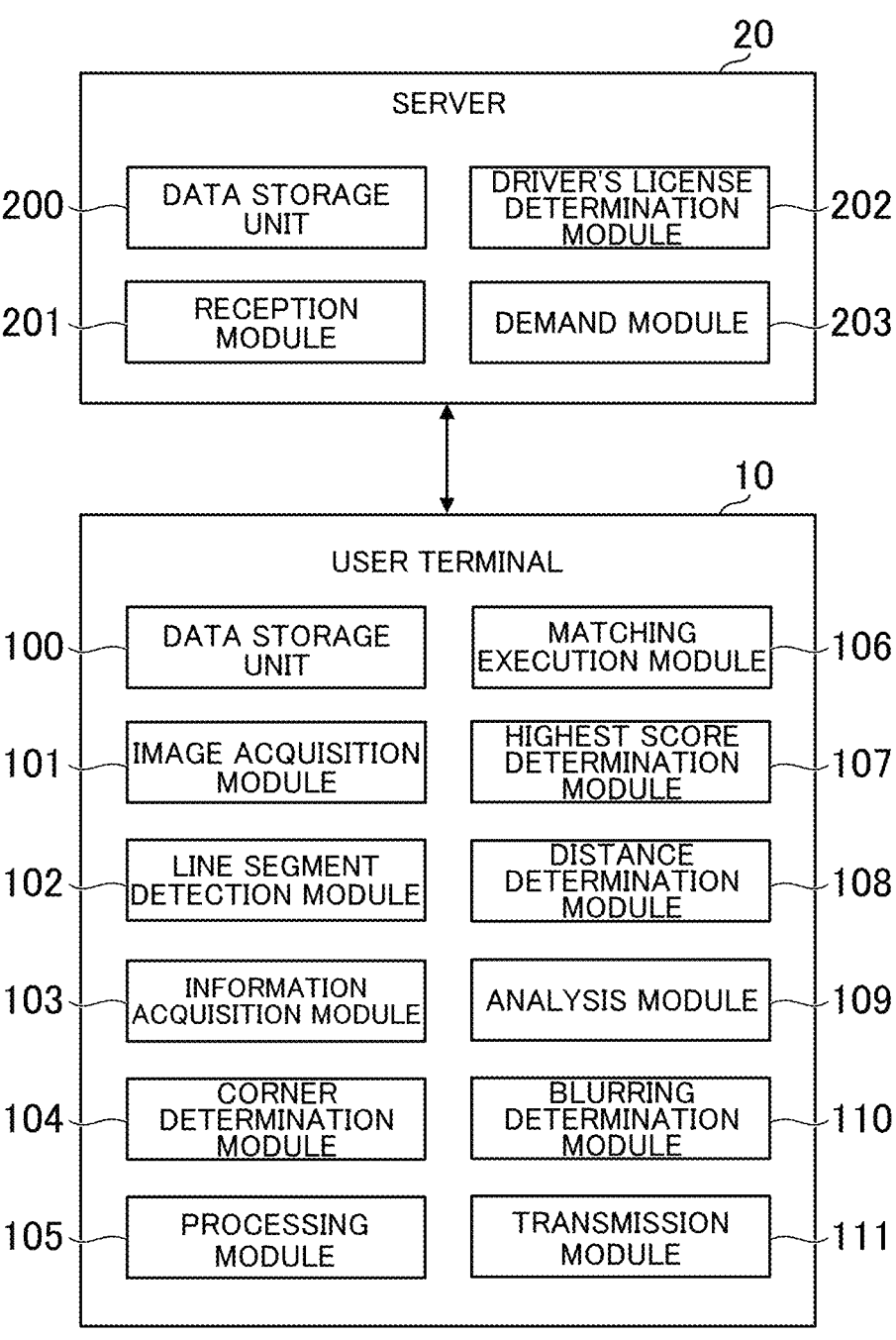
FIG. 2 is a function block diagram for illustrating an example of functions implemented in the image processing system.

FIG. 2 is a function block diagram for illustrating an example of functions implemented in the image processing system S.

3-1. Functions Implemented on User Terminal

A data storage unit 100 is implemented mainly by the storage unit 12. Other functions of the user terminal 10 are implemented mainly by the control unit 11. The data storage unit 100 and a transmission module 111 are functions related to both of the first configuration and the second configuration. An image acquisition module 101, a line segment detection module 102, an information acquisition module 103, a corner determination module 104, and a processing module 105 are functions related mainly to the first configuration. The image acquisition module 101, a matching execution module 106, a highest score determination module 107, a distance determination module 108, an analysis module 109, and a blurring determination module 110 are functions related mainly to the second configuration.

Data Storage Unit

The data storage unit 100 stores data required for image processing. For example, the data storage unit 100 stores an app for using the service described above. In this embodiment, a case in which image processing is executed as processing of this app is described. However, image processing may be executed as processing of any program. For example, image processing may be executed as a script executed from a browser or as processing of another program. The data storage unit 100 may store a template image described later and a photographed image.

Image Acquisition Module

The image acquisition module 101 acquires a photographed image including a driver's license. The driver's license is an example of a target object. The driver's license is an example of an identity verification document of the user, and it can thus be said that an identity verification document of the user is an example of the target object. Accordingly, "driver's license" or "identity verification document" in the description can be read as a target object. The photographed image is an example of a target object image. Accordingly, "photographed image" in the description can be read as a target object image.

The target object is an object to be processed by image processing. In a case of image processing aimed to ultimately detect an object of a specific type, this object is the target object. When a photographed image is the target object image as in this embodiment, a photographed subject is the target object. When a scanned image described later is the target object image, an object read by a scanner is the target object. When a sensor image described later is the target object image, an object detected by a sensor is the target object. The target object may be any object and is not limited to an identity verification document. For example, the target object may be a person, a specific part of a person, an animal other than human, a building, a landscape, a sign, or any other object.

The target object image is an image including the target object. The target object is shown in at least a part of the target object image. Inclusion of at least one pixel depicting a part of the target object qualifies as inclusion of the target object. The target object image may include only a part of the target object. It can be said that the target object image is an image in which the target object is caught. In this embodiment, the target object image is a photographed image generated by the photographing unit 16 by photographing an identity verification document in succession. This photographed image is individual images (frames) forming a moving image. When a camera function of the photographing unit 16 is used instead of a video function of the photographing unit 16, a single still image is the photographed image.

The measure to generate the target object image is not limited to the photographing unit 16, and various publicly known measures are usable. For example, the target object image may be generated by a camera outside the user terminal 10. To give another example, a scanner may generate the target object image. When the target object image is generated by the scanner, a scanned image in which a reading result of the scanner is shown is the target object image. The target object image may also be generated by, for example, a sensor capable of detecting an object (e.g., an infrared sensor or an ultrasonic sensor). When the sensor generates the target object image, a sensor image in which a detection result of the sensor is shown is the target object image.

The image acquisition module 101 acquires the target object image from any measure to generate the target object image. The target object image may be stored in the data storage unit 100 in advance. In this case, the image acquisition module 101 may acquire the target object image from the data storage unit 100. The target object image may be stored on an external information storage medium or an external computer. In this case, the image acquisition module 101 may acquire the target object image from the external information storage medium or the external computer.

Figure 3:
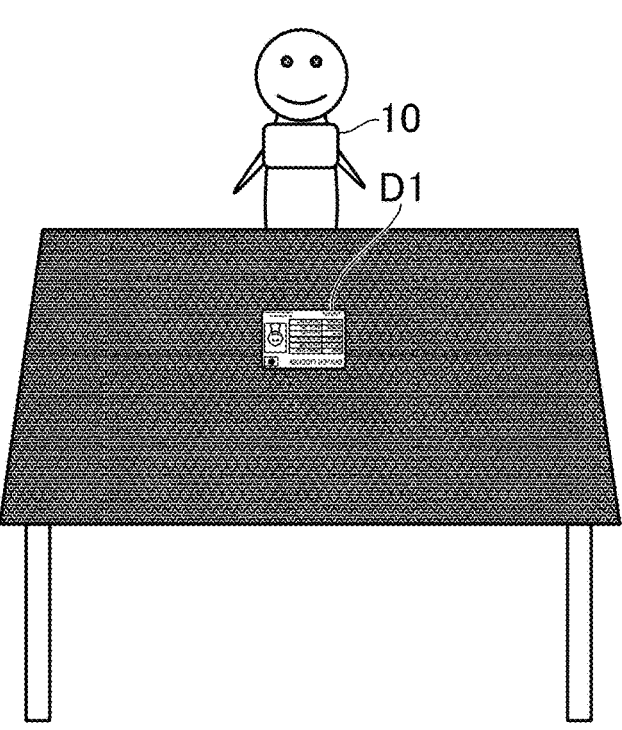
FIG. 3 is a diagram for illustrating an example of photographing of a driver's license by a user.
Figure 3:
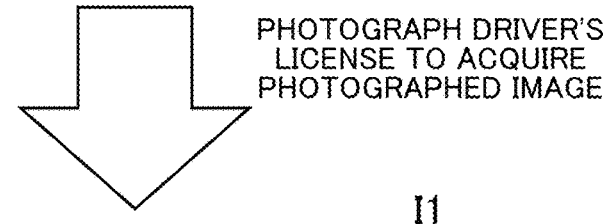
Figure 3:
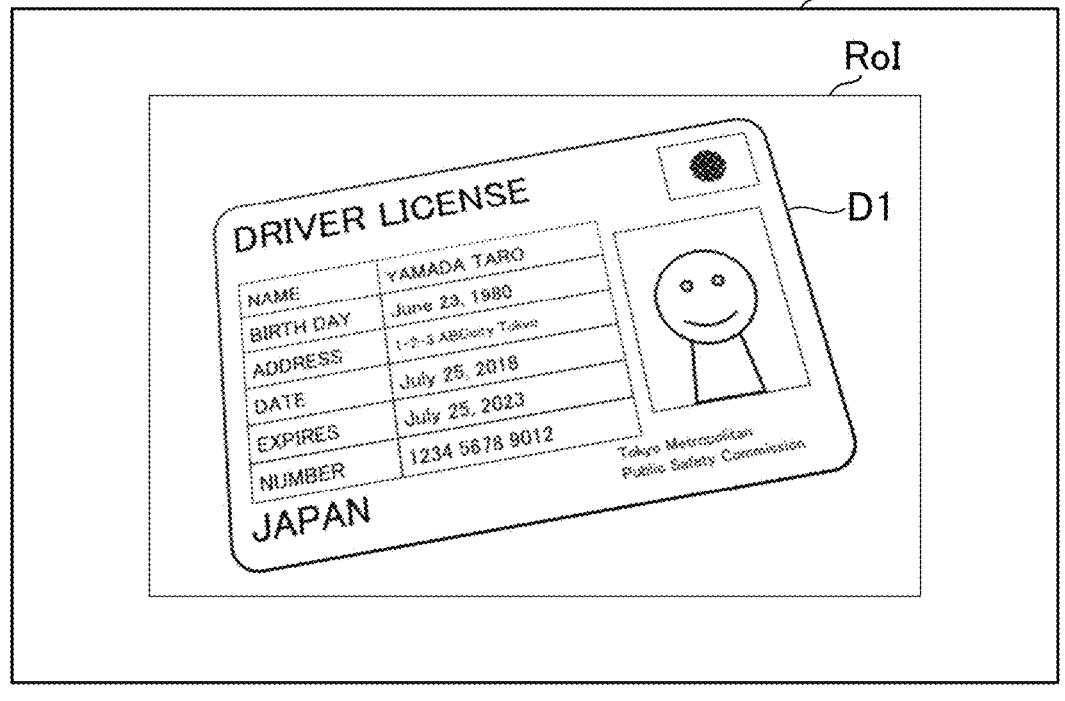

FIG. 3 is a diagram for illustrating an example of photographing of a driver's license by the user. In FIG. 3, a photographed image I1 including a fictional driver's license is given as an example. As illustrated in FIG. 3, a case in which the user photographs a driver's license placed on a table is described in this embodiment. However, the driver's license may be photographed from any direction. For example, the user may photograph the driver's license held in his or her hand. To give another example, the user may photograph the driver's license held close to his or her face with the photographing unit 16 facing the user so that the user's face and the driver's license are both included in a photographing range of the photographing unit 16. A background is omitted from the photographed image I1 of FIG. 3. In actuality, the photographed image I1 includes the background.

In this embodiment, the image acquisition module 101 acquires the photographed image I1 that is images generated in succession by the photographing unit 16. The image acquisition module 101 temporarily stores the photographed image I1 that is images acquired in succession in the data storage unit 100. The user terminal 10 displays the photographed image I1 that is images generated in succession on the display unit 15. In this embodiment, a region of interest RoI which is a target of image processing is displayed on the display unit 15. The user photographs the driver's license so that an outline of a driver's license D1 runs along the region of interest RoI and so that the driver's license D1 is contained within the region of interest RoI.

The region of interest RoI in this embodiment has a shape that is the same as or similar to the outline of the driver's license D1. In the example of FIG. 3, the driver's license D1 has a rectangular shape with rounded corners, the region of interest RoI is rectangular, and the two accordingly have shapes similar to each other (the same shape in the sense that the shapes of the two are rectangular). The region of interest RoI may have a shape obtained by multiplying a length and a width of the driver's license D1 a predetermined number of times. The region of interest RoI may have a shape different from the outline of the driver's license D1. For example, the region of interest RoI may be circular or elliptic. In this embodiment, a case in which the region of interest RoI is a part of the photographed image I1 is described. However, the region of interest RoI may be the entirety of the photographed image I1. In this case, the whole photographed image I1 is to be processed by image processing.

The driver's license D1 in this embodiment includes a standard part. The standard part is a part having fixed contents, and is a part common to the driver's license D1 of another user. For example, the standard part is a format part in a document, and is a part depicting specific characters, symbols, graphic forms, frame borders, illustration, or images. It can be said that the standard part is a part including information unique to the document. The driver's license D1 may include a plurality of standard parts. The standard part may be placed in any place, for example, the vicinity of a corner of the target object. The vicinity of a corner is a place within a predetermined distance (for example, from 1 millimeter to 2 centimeters) from the corner. In the case of a rectangle with rounded corners as is the case of the driver's license D1 of FIG. 3, "corner" is a point farthest from a center point of the driver's license D1 along the outline of the driver's license D1 (for example, a point along an arc of one of the four corners).

In the case of the driver's license D1 of FIG. 3, a title "DRIVER LICENSE" is an example of the standard part. Item names "NAME," "BIRTH DAY," "ADDRESS," "DATE," "EXPIRES," and "NUMBER" are also an example of the standard part. A country name "JAPAN" is also an example of the standard part. An organization name "Tokyo Metropolitan Public Safety Commission" is also an example of the standard part. The standard part is not limited to characters such as those described above, and an image depicting Japan's national flag in the driver's license D1 is also an example the standard part. Frame borders framing the item names and the others described above are also an example of the standard part.

The driver's license D1 in this embodiment include a non-standard part as well. The non-standard part is a part in which contents are not fixed, and a part that is not common to other documents. The non-standard part is a part other than the standard part in a document, for example, the user's name, birthday, address, or another piece of personal information. It can be said that the non-standard part is a part including information unique to the user.

In the case of the driver's license of FIG. 3, a name "YAMADA TARO" is an example of the non-standard part. A birth date "Jun. 23, 1980" is also an example of the non-standard part. An address "1-2-3 ABCcity Tokyo" is also an example of the non-standard part. An issue date "Jul. 25, 2018" is also an example of the non-standard part. An expiration date "Jul. 25, 2023" is also an example of the non-standard part. A license number "1234 5678 9012" is also an example of the non-standard part. A face photograph of the user of FIG. 3 is another example of the non-standard part. However, although the contents of the face photograph varies from user to user, a frame border of the face photograph that is common among users is the standard part.

Line Segment Detection Module

The line segment detection module 102 detects a plurality of line segments from the photographed image I1, based on predetermined line segment detection processing. The line segment detection processing is processing of detecting line segments in an image. The line segments represent outlines of individual elements (the standard part and the non-standard part) included in the driver's license D1, or a part of the outlines. The line segment detection processing may also be called straight line detection processing or edge detection processing. Various publicly known algorithms are usable for the line segment detection processing, and Hough transform or a line segment detector (LSD), for example, may be used. In this embodiment, the photographed image I1 is acquired as successive images, and the line segment detection module 102 accordingly detects a plurality of line segments for each of the successive images of the photographed image I1. That is, the line segment detection module 102 detects a plurality of line segments by executing processing described below for each of the successive images of the photographed image I1.

Figure 4:
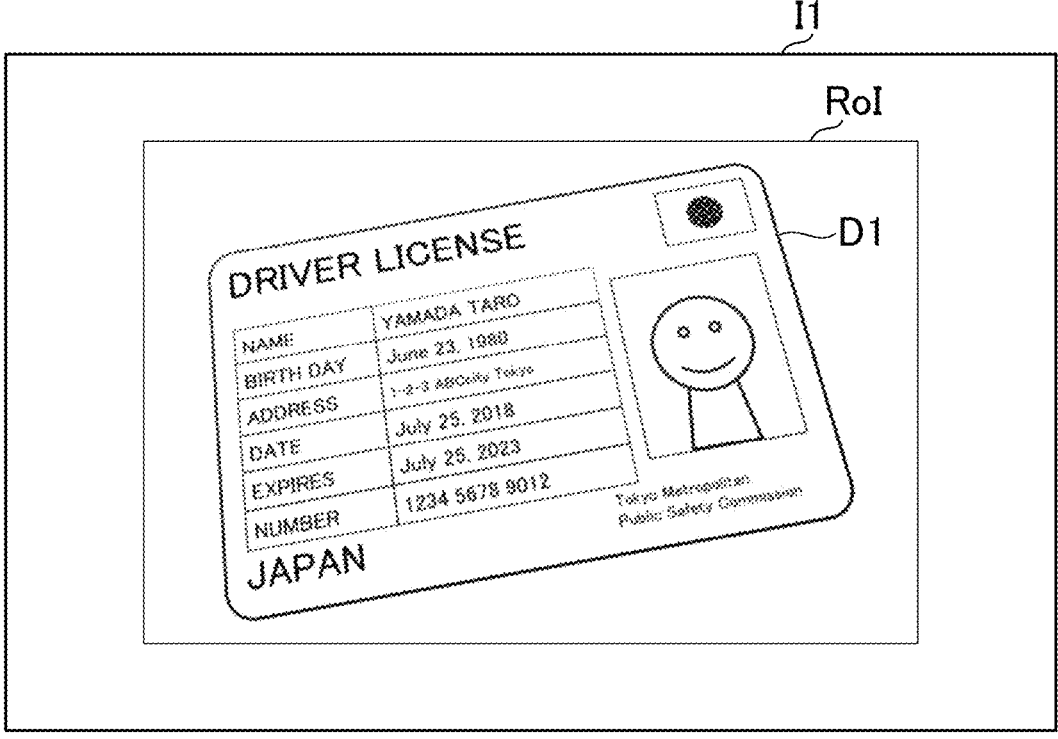
FIG. 4 is a diagram for illustrating an example of processing executed by a line segment detection module.
Figure 4:
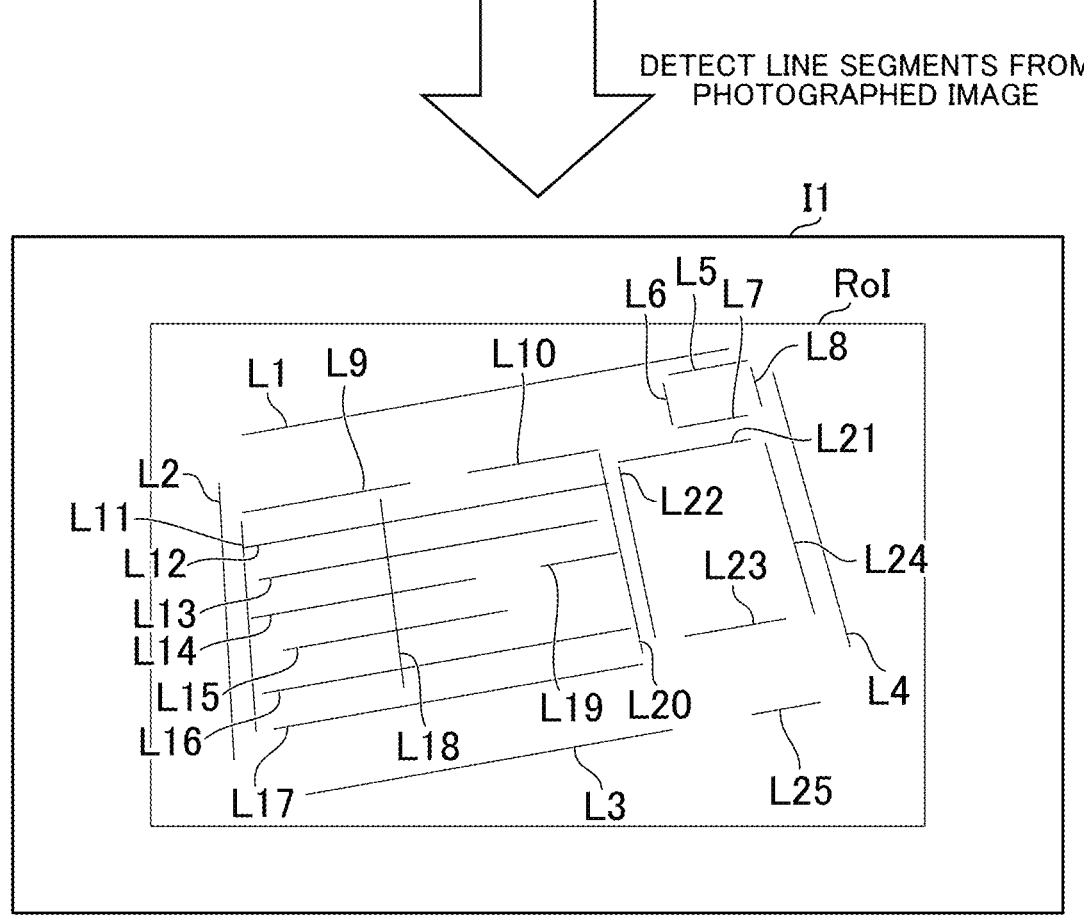
Figure 5:
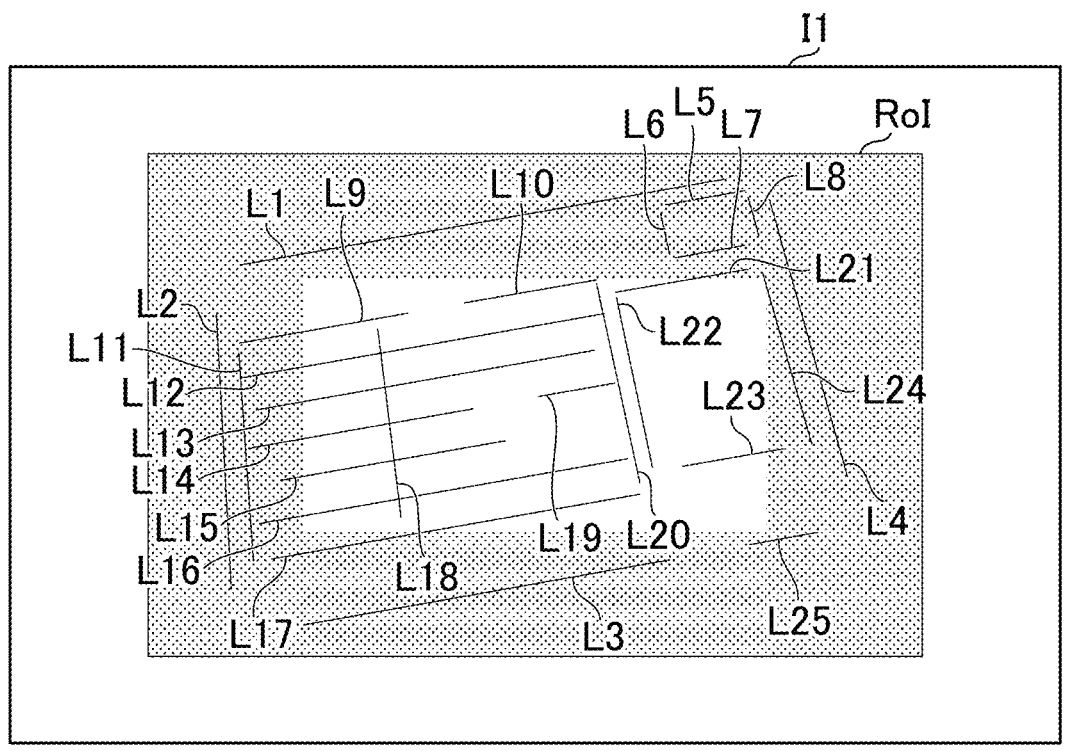
FIG. 5 is a diagram for illustrating the example of the processing executed by the line segment detection module.
Figure 5:
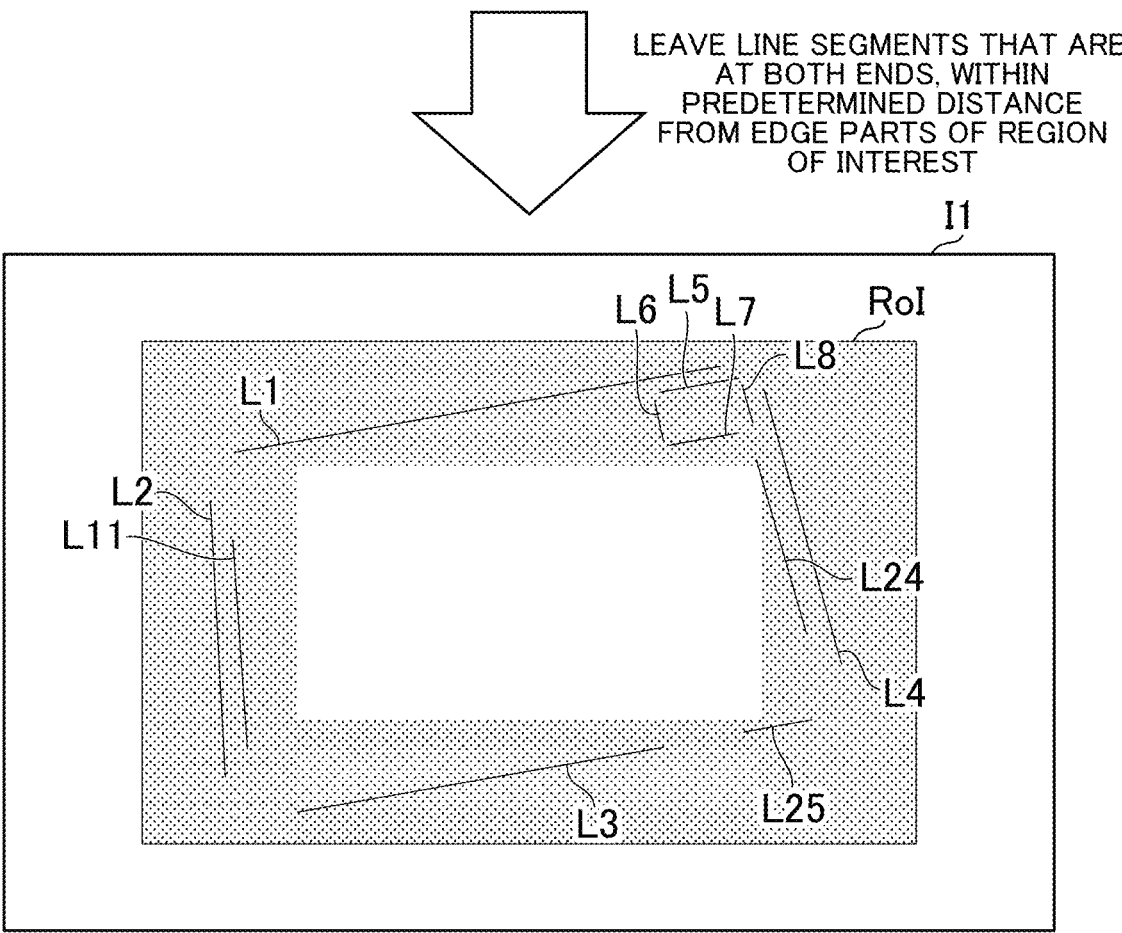
Figure 6:
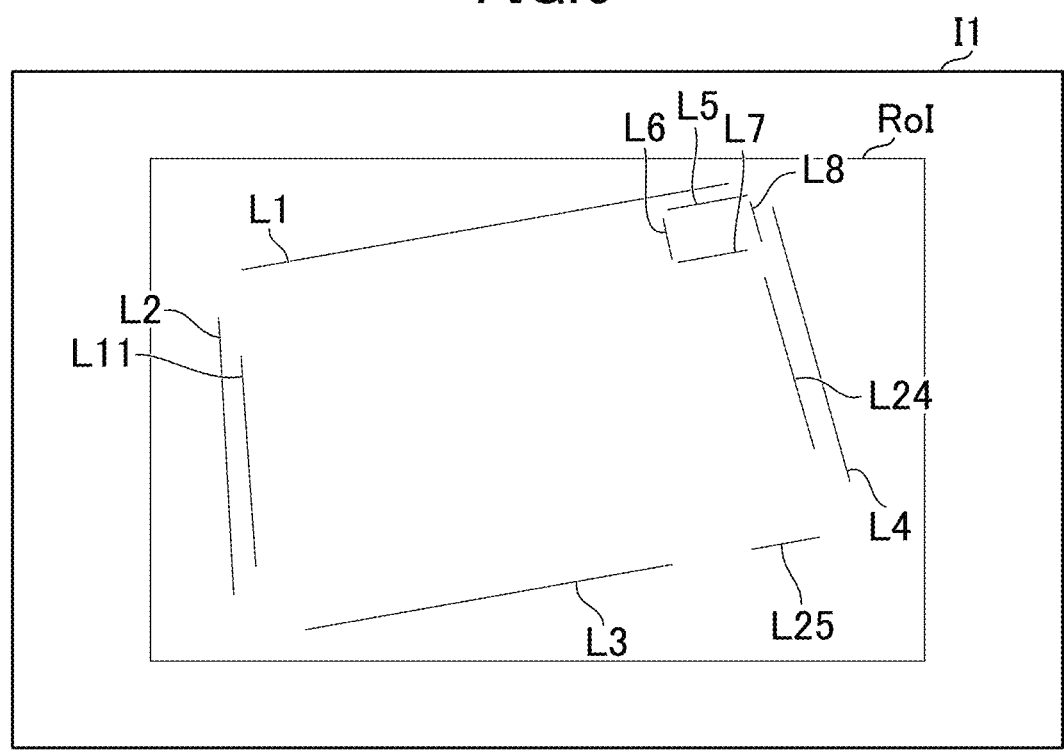
FIG. 6 is a diagram for illustrating the example of the processing executed by the line segment detection module.
Figure 6:
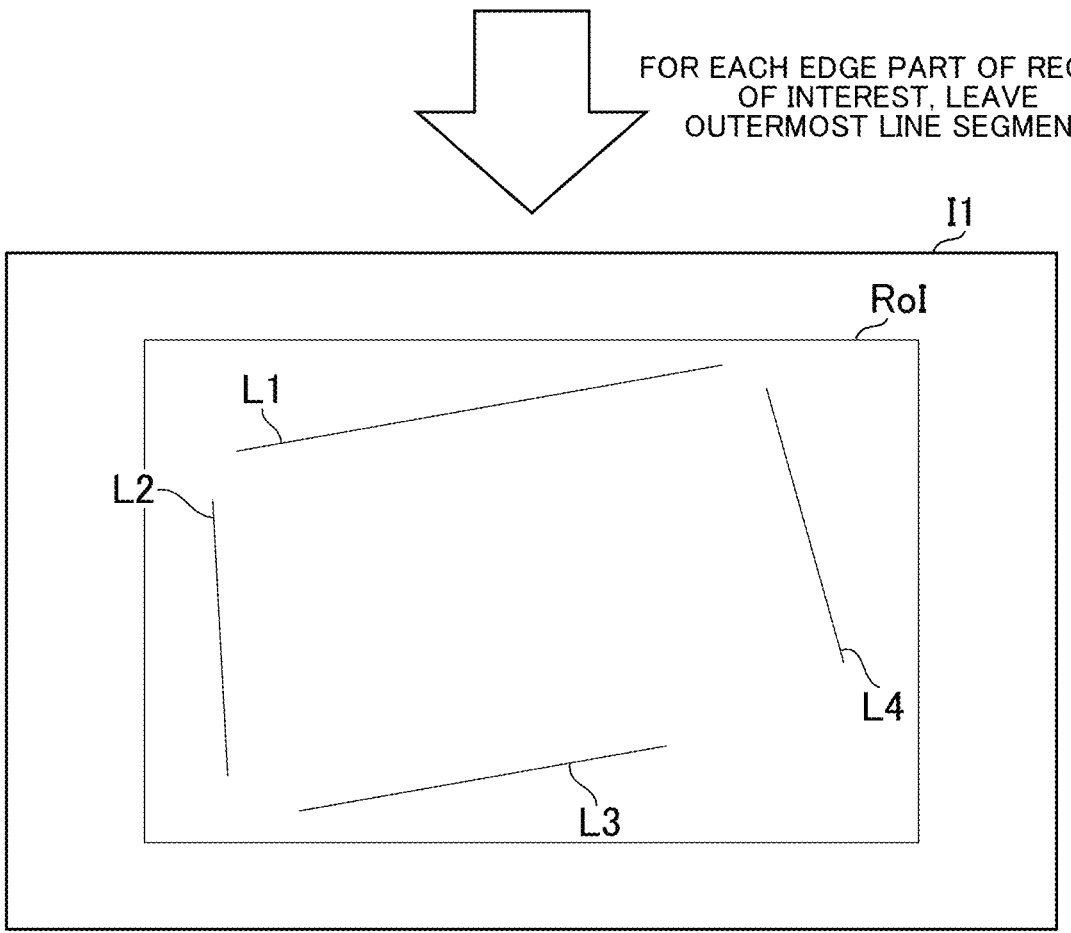

FIG. 4 to FIG. 6 are diagrams for illustrating an example of the processing executed by the line segment detection module 102. In the example of FIG. 4, the line segment detection module 102 detects a plurality of line segments L1 to L25 for each of the successive images of the photographed image I1. In the following description, the line segments L1 to L25 are referred to as "line segments L" when distinction between one line segment and another line segment is not required. As is the case for the line segments L9 and L10, a single line segment may be divided into a plurality of line segments, depending on how well the driver's license D1 is photographed. There is also a case in which the entirety of one line segment from end to end is not fully detected, and only a part of a line segment is often detected as in FIG. 4. To give another example, when the user photographs the driver's license D1 held in his or her hand, the outline of the driver's license D1 is hidden by fingers and is consequently divided into a plurality of line segments L.

Of the line segments L1 to L25, the line segments L1 to L4 represent parts of the outline of the driver's license D1. The line segment detection module 102 detects the plurality of line segments L1 to L4 representing parts of the outline of the driver's license D1. The outline of the driver's license D1 may be said as an outer frame or edges of the driver's license D1. The driver's license D1 in this embodiment is a rectangle with rounded corners, and the outline of the driver's license D1 accordingly includes four line segments at top and bottom and on a left-hand side and a right-hand side, and arcs in the four corners. Although the line segments L1 to L4 at the top and the bottom and on the left-hand side and the right-hand side are all detected in the example of FIG. 4, only some of the line segments L out of the top, bottom, left, and right line segments are detected in some cases.

The line segment detection module 102 executes the line segment detection processing in the region of interest RoI out of the photographed image I1 to detect the line segments L1 to L25 from the region of interest RoI. The line segment detection module 102 may execute the line segment detection processing in only a part of the region of interest RoI. For example, the line segment detection module 102 may execute the line segment detection processing for one part of the region of interest RoI at a time, starting from an outer part and advancing inward. In this case, the line segment detection module 102 may execute the line segment detection processing for each edge part of the region of interest RoI, and end the line segment detection processing for that edge part when one of the line segments L that is closest to that edge part is detected.

The region of interest RoI may not particularly be set in the photographed image I1. In this case, the line segment detection module 102 may execute the line segment detection processing for the entirety of the photographed image I1 to detect the segments L from the entire photographed image I1. To give another example, the line segment detection module 102 may execute the line segment detection processing for one part of the photographed image I1 at a time, starting from an outer part and advancing inward. In this case, the line segment detection module 102 may execute the line segment detection processing for each edge part of the photographed image I1, and end the line segment detection processing for that edge part when one of the line segments L that is closest to that edge part is detected.

The line segment detection module 102 detects, from the photographed image I1, the plurality of line segments L1 to L4 which are located relatively on an outer side, based on the predetermined line segment detection processing. In this embodiment, the region of interest RoI is set, and the line segment detection module 102 accordingly detects the plurality of line segments L1 to L4 located relatively on the outer side in the region of interest RoI of the photographed image I1. For example, the line segment detection module 102 detects the plurality of line segments L1 to L4 which are each included in the region of interest RoI at both ends and which are located relatively on the outer side in the region of interest RoI.

In this embodiment, the line segment detection module 102 detects a plurality of line segments which are each included, at both ends, within a predetermined distance from at least one edge portion of the region of interest RoI, and which are located relatively on the outer side in the region of interest. In FIG. 5, places within the predetermined distance from one of an upper edge part, a lower edge part, a left edge part, and a right edge part of the region of interest RoI are hatched. The predetermined distance can be any length as long as a position relatively close to the one of the edge parts can be defined. For example, the predetermined distance may define a region that is from approximately 10% to approximately 30% of the region of interest RoI lengthwise or widthwise.

In the example of FIG. 5, the line segment detection module 102 detects, as the line segments L that are each relatively close to one of the edge parts, the line segments L1 to L8, L11, L24, and L25 included in the hatched region. As illustrated in FIG. 6, the line segments L then detects, for each of the edge parts of the region of interest RoI, a line segment closest to that edge part, to thereby detect the plurality of line segments L1 to L4. For example, the line segment detection module 102 detects the line segment L1 closest to a top edge of the region of interest RoI. The line segment detection module 102 detects the line segment L2 closest to a left edge of the region of interest RoI. The line segment detection module 102 detects the line segment L3 closest to a bottom edge of the region of interest RoI. The line segment detection module 102 detects the line segment L4 closest to a right edge of the region of interest RoI.

The line segment detection module 102 may detect a plurality of line segments that are relatively long and that are located relatively on the outer side. For example, when the line segments L3 and L25 are at approximately the same distance from the bottom edge of the region of interest RoI, the line segment detection module 102 may detect the line segment L3, which is longer. A threshold value for the lengths of the line segments L may be set in the line segment detection processing executed for the first time. That is, the line segment detection module 102 may detect the line segments L1 to L25 as the line segments L each having a length equal to or more than the threshold value. A setting method in publicly known line segment detection processing is usable to set the threshold value. The line segment detection module 102 may detect one of the line segments L that is the second, third, or subsequent outermost line segment in the region of interest RoI, instead of one of the line segments L that is the outermost line segment in the region of interest RoI. It is sufficient for the line segment detection module 102 to detect the line segments L that are located on an outer side relative to other line segments L.

Information Acquisition Module

The information acquisition module 103 acquires information about the outline of the driver's license D1 in the photographed image I1, based on the plurality of line segments L1 to L4. The information about the outline is information about a position of at least a part of the outline of the driver's license D1. For example, information indicating at least one position on the outline of the driver's license D1, or a position near the at least one position (a position within a predetermined distance from the outline) qualifies as the information about the outline. A position in the photographed image I1 may be expressed by any method, for example, by coordinates in a screen coordinate system having the upper left as the origin.

In this embodiment, a case in which the information acquisition module 103 acquires, as the information about the outline, corner information about a plurality of corners of the driver's license D1 in the photographed image I1 is described. Accordingly, "corner information" in the description can be read as the information about the outline. The corner information is information indicating a position of each of the plurality of corners of the driver's license D1, or a position near the position of the corner (a position within a predetermined distance from the corner). The corner information indicates the positions of all of or some of the corners of the driver's license D1. In this embodiment, the photographed image I1 is acquired as successive images, and the information acquisition module 103 accordingly acquires the corner information for each of the successive images of the photographed image I1. That is, the line segment detection module 102 detects a plurality of line segments by executing processing described below for each of the successive images of the photographed image I1.

Figure 7:
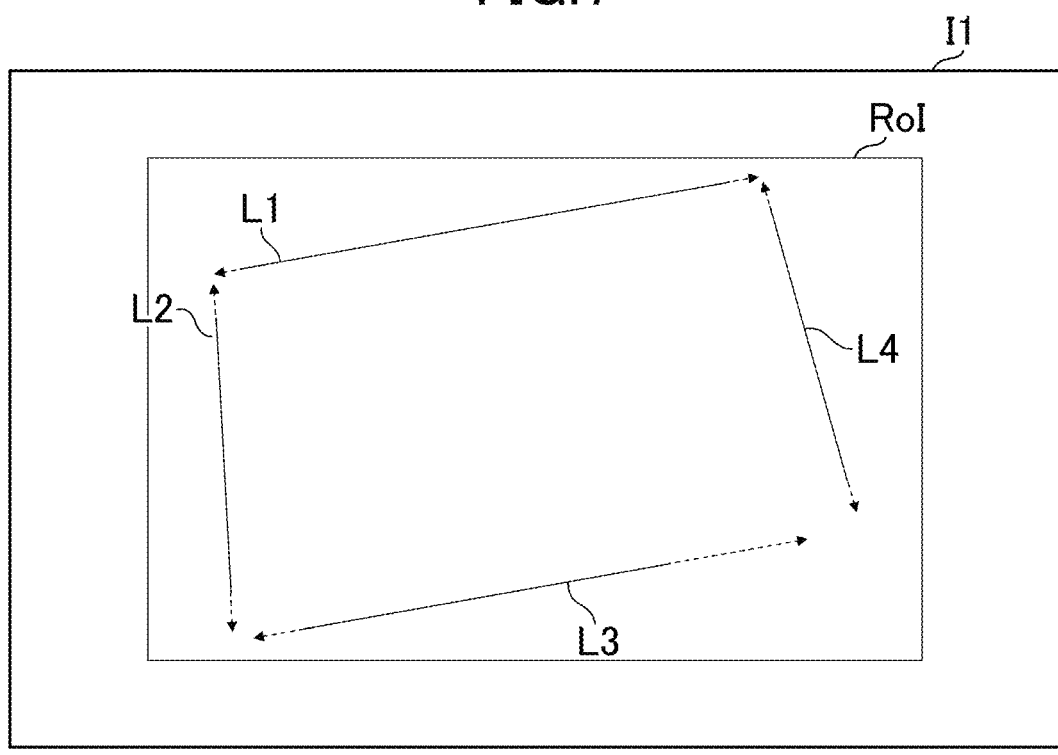
FIG. 7 is a diagram for illustrating an example of processing executed by an information acquisition module.
Figure 7:
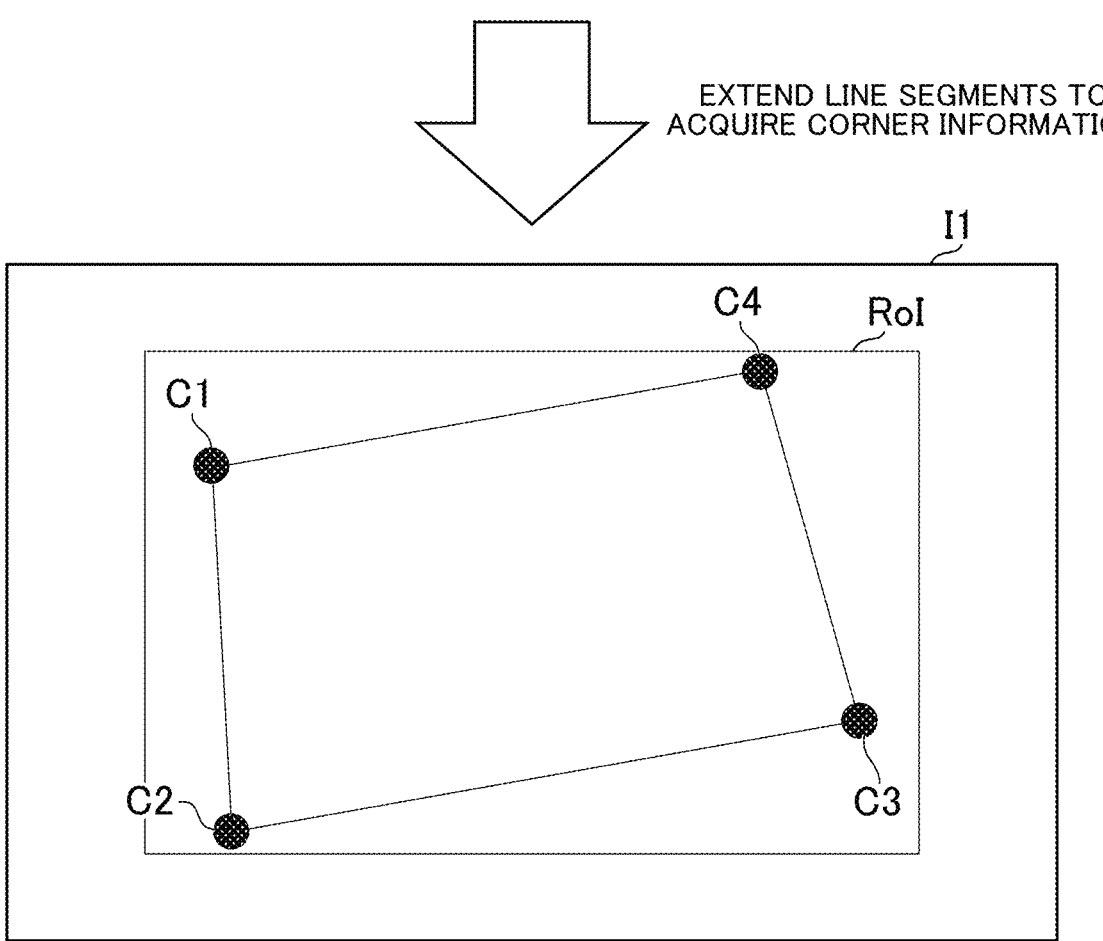

FIG. 7 is a diagram for illustrating an example of processing executed by the information acquisition module 103. As in FIG. 7, the information acquisition module 103 acquires the corner information by extending at least one of the plurality of line segments L1 to L4 and thus deducing the positions of a plurality of corners C1 to C4. The corners C1 to C4 are hereinafter simply referred to as "corners C" when distinction between one corner and another corner is not required. For example, the information acquisition module 103 extends both ends of the line segments L1 to L4 until the line segments L1 to L4 intersect with one another. The information acquisition module 103 detects intersection points between the extended line segments as the corners C1 to C4. In this embodiment, the driver's license D1 is a rectangle with rounded corners and, strictly speaking, the intersection points are not at the positions of the corners. However, the intersection points are positioned close enough to the corners to be deemed as the corners, and are accordingly deemed as the corners in this embodiment.

For example, the information acquisition module 103 detects an intersection point between the line segment L1, which represents the outline on the top side, and the line segment L2, which represents the outline on the left-hand side, as the upper left corner C1. The information acquisition module 103 detects an intersection point between the line segment L2, which represents the outline on the left-hand side, and the line segment L3, which represents the outline on the bottom side, as the lower left corner C2. The information acquisition module 103 detects an intersection point between the line segment L3, which represents the outline on the bottom side, and the line segment L4, which represents the outline on the right-hand side, as the lower right corner C3. The information acquisition module 103 detects an intersection point between the line segment L1, which represents the outline on the top side, and the line segment L4, which represents the outline on the right-hand side, as the upper right corner C4.

The information acquisition module 103 may correct the positions of the corners C1 to C4 so as to be close to the positions on the arcs of the four corners which are the true corners of the driver's license D1. In this case, the information acquisition module 103 corrects the positions of the corners C1 to C4 so that the corners C1 to C4 which are the intersection points become a little closer to the center point of those. The information acquisition module 103 may deduce, from a positional relationship of three corners out of the four corners C1 to C4, the position of the remaining one corner because a horizontal-to-vertical ratio of the driver's license D1 is known in advance. For example, the information acquisition module 103 detects the corners C1 to C3 by extending the three line segments L1 to L3. The information acquisition module 103 may detect, as the corner C4, a position distanced from the corners C1 and C3 by a length determined by a positional relationship of the corners C1 to C3, in a direction determined by the positional relationship.

Corner Determination Module

The corner determination module 104 determines whether at least one of the corners C of the driver's license D1 which are deduced based on the corner information is outside the region of interest RoI. It is assumed that data by which a position of the region of interest RoI in the photographed image I1 can be identified is stored in the data storage unit 100. This data is, for example, coordinates of the four corners of the region of interest RoI. The corner determination module 104 determines, for each one of the corners C, whether the position of the one of the corners C in the photographed image I1 is outside the region of interest ROI. In the example of FIG. 7, the corner determination module 104 determines that all of the four corners C1 to C4 are inside the region of interest RoI.

Figure 8:
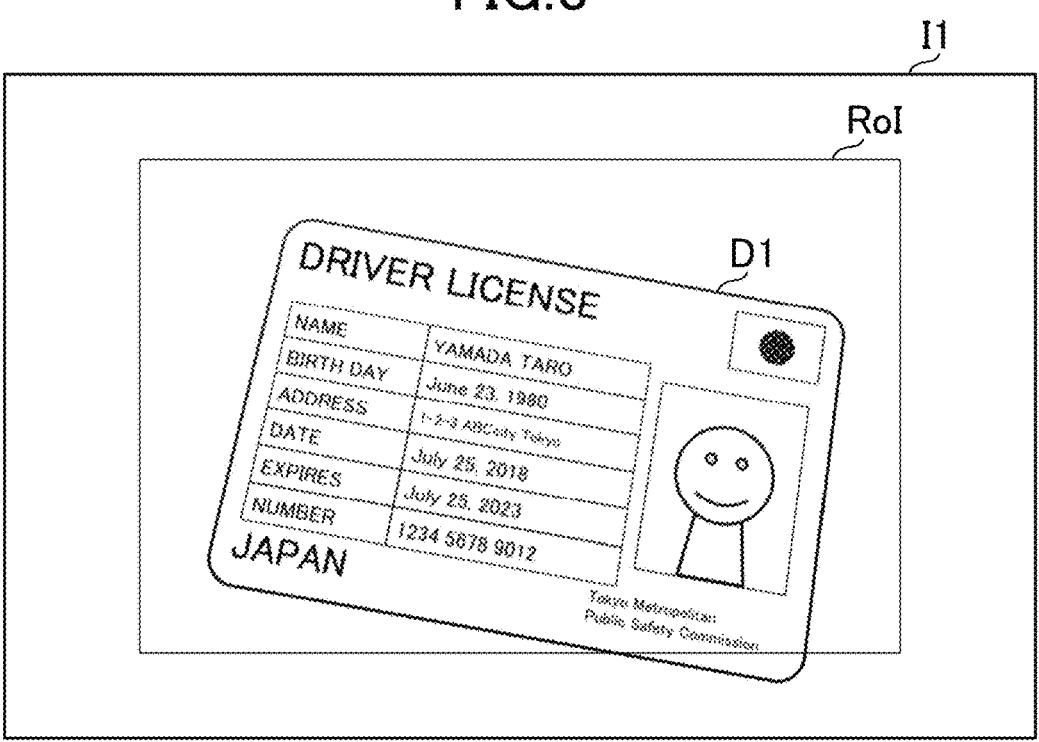
FIG. 8 is a diagram for illustrating an example of a case in which a lower right corner is outside a region of interest.
Figure 8:
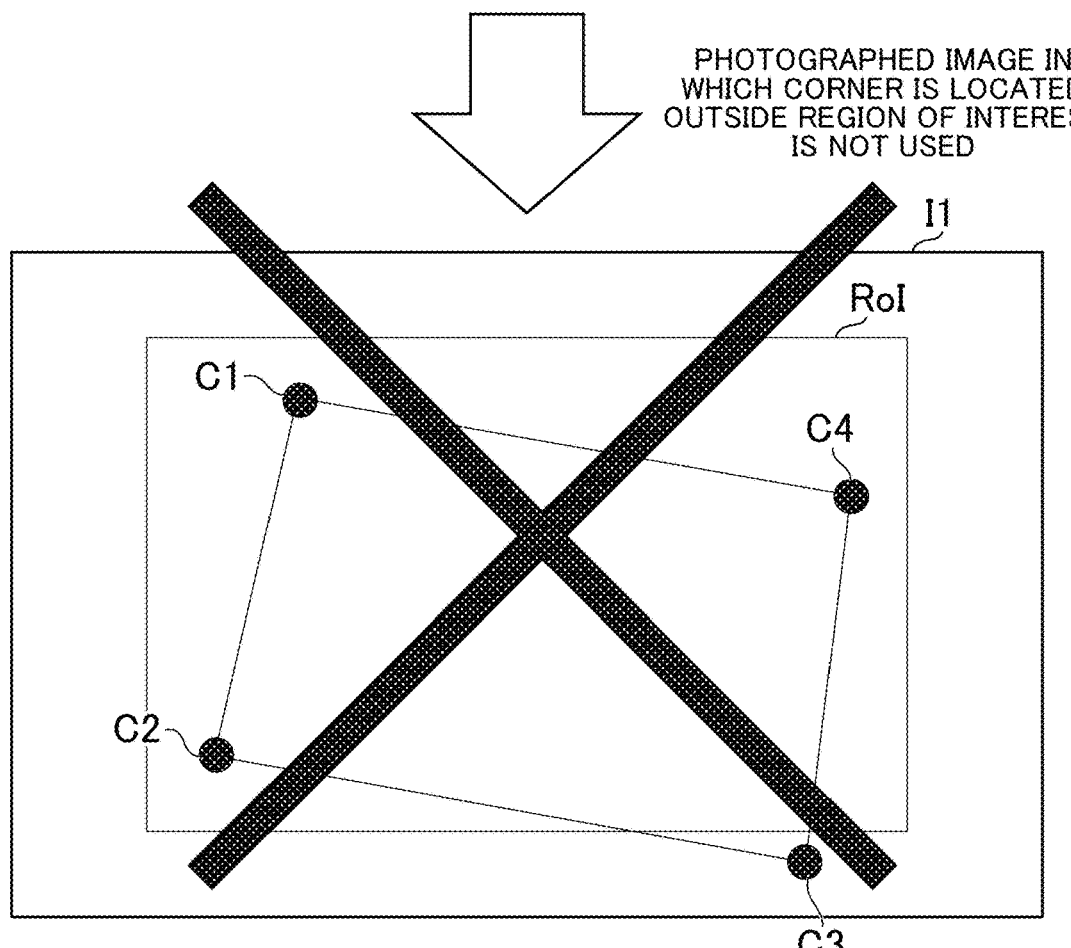

FIG. 8 is a diagram for illustrating an example of a case in which the lower right corner C3 is outside the region of interest RoI. For the photographed image I1 of FIG. 8 as well, the corners C1 to C4 are detected by the processing of the line segment detection module 102 and the processing of the information acquisition module 103. In the example of FIG. 8, the corner determination module 104 determines that the corners C1 to C3 are inside the region of interest RoI, and that the corner C4 is outside the region of interest RoI. When the driver's license D1 is photographed such that the driver's license D1 is not contained within the region of interest RoI, for example, at least one of the corners C ends up outside the region of interest RoI. To give another example, when the driver's license D1 is contained inside the region of interest RoI but is greatly distorted, the line segments L are required to be extended long before intersecting, and consequently at least one of the corners C may end up outside the region of interest RoI.

Processing Module

The processing module 105 processes at least a part of the photographed image I1 so that the outline of the driver's license D1 in the photographed image I1 approximates a predetermined outline, based on the corner information acquired by the information acquisition module 103. In this embodiment, the photographed image I1 is acquired as successive images, and the processing module 105 accordingly executes the processing for each of the successive images of the photographed image I1.

The predetermined outline is an outline to aim for. An example of the predetermined outline is an outline obtained when the driver's license D1 is photographed at a predetermined distance from a frontal direction. When the user is demanded to photograph the driver's license D1 intentionally tilted, the predetermined outline is an outline obtained through photographing in which a positional relationship between the driver's license D1 and the photographing unit 16 is a predetermined positional relationship. It suffices that the predetermined outline is any outline having a predetermined shape.

To assume the predetermined outline means that an outline after image processing matches the predetermined outline. To approximate the predetermined outline means that, although the outline after the image processing does not match the predetermined outline, a gap between the outline after the image processing and the predetermined outline is smaller than a gap between an outline before the image processing and the predetermined outline.

Processing by the processing module 105 is to execute at least one of linear conversion (for example, scaling, trimming, and rotation) or parallel displacement. Processing by the processing module 105 is also referred to as "conversion," "shaping," or "editing." In this embodiment, a case in which the inside of a region of the photographed image I1 that is defined by the corners C1 to C4 is the target of the processing by the processing module 105 is described. However, the entire photographed image I1 may be the target of the processing by the processing module 105. To give another example, the entirety of the region of interest RoI, which is a part of the photographed image I1, may be the target of the processing by the processing module 105. It is sufficient to execute the processing by the processing module 105 for the entirety of or a part of the photographed image I1.

Figure 9:
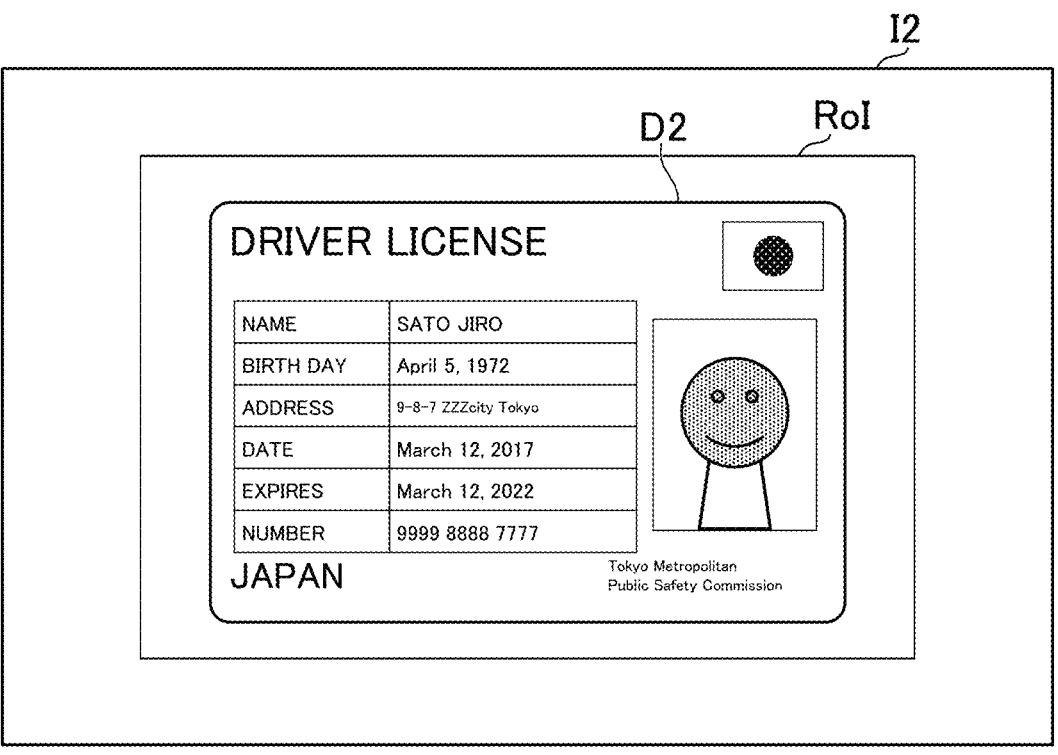
FIG. 9 is a diagram for illustrating an example of processing executed by a processing module.
Figure 9:
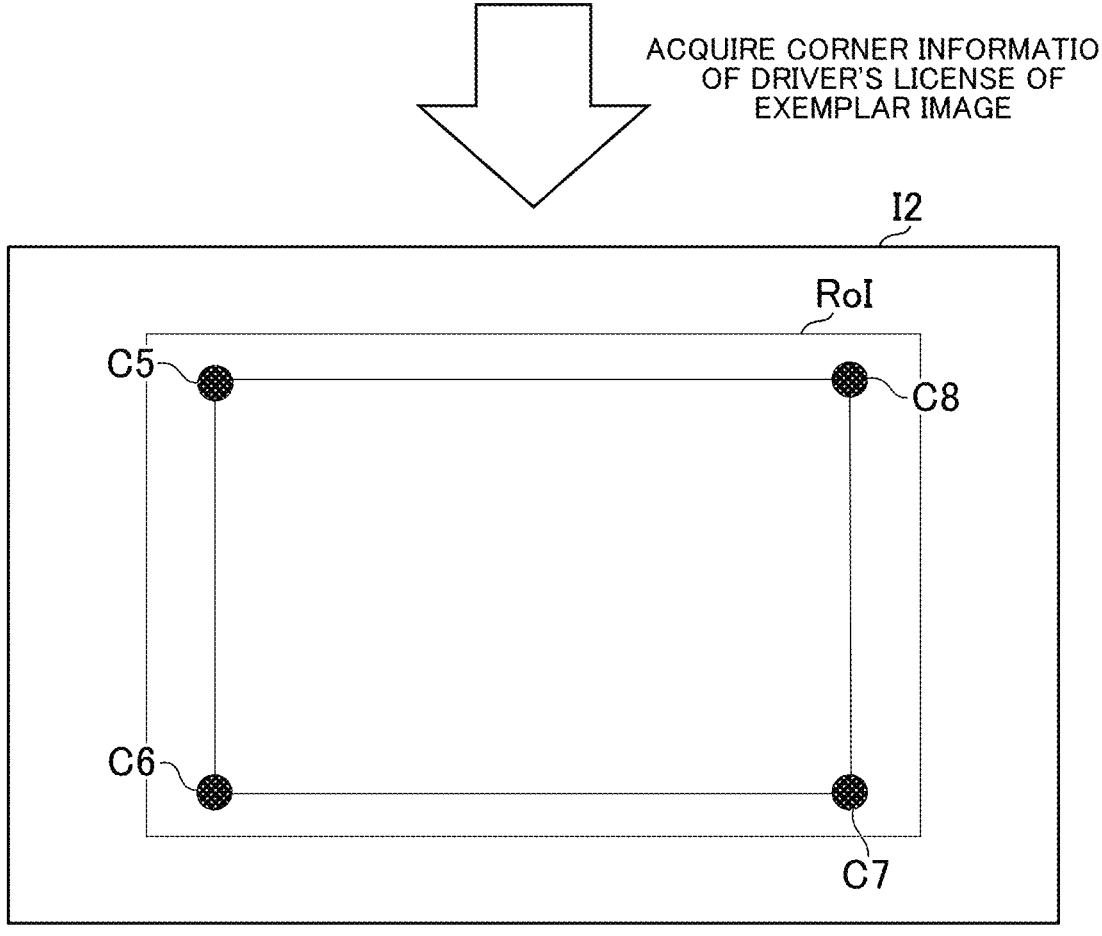
Figure 10:
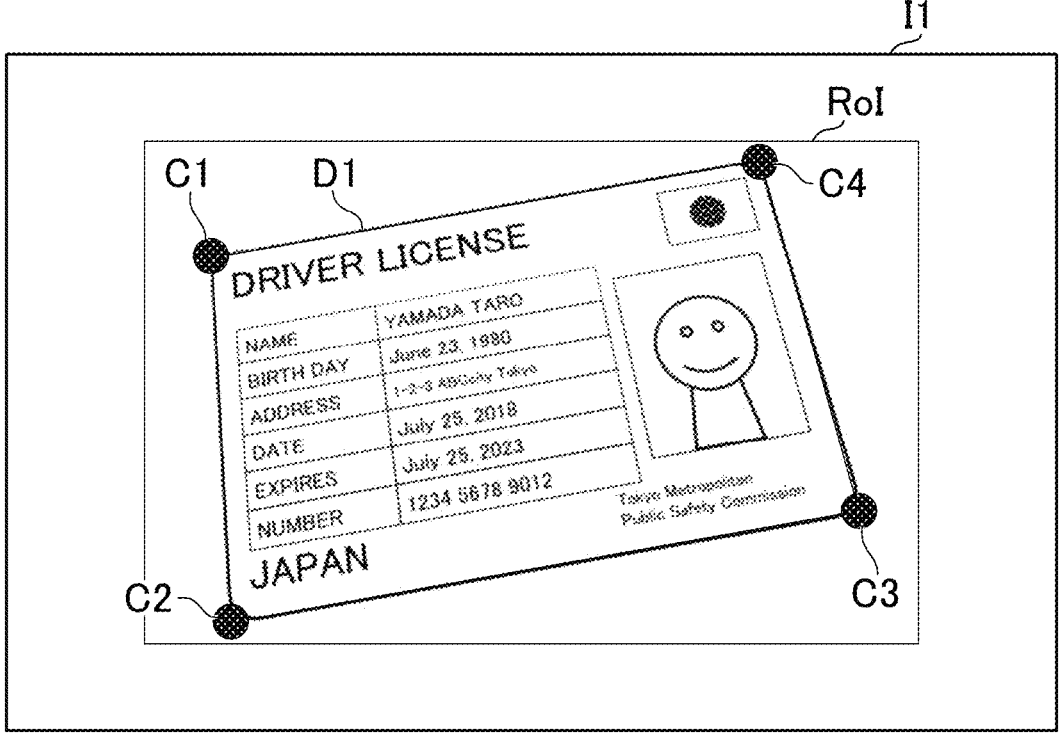
FIG. 10 is a diagram for illustrating the example of the processing executed by the processing module.
Figure 10:
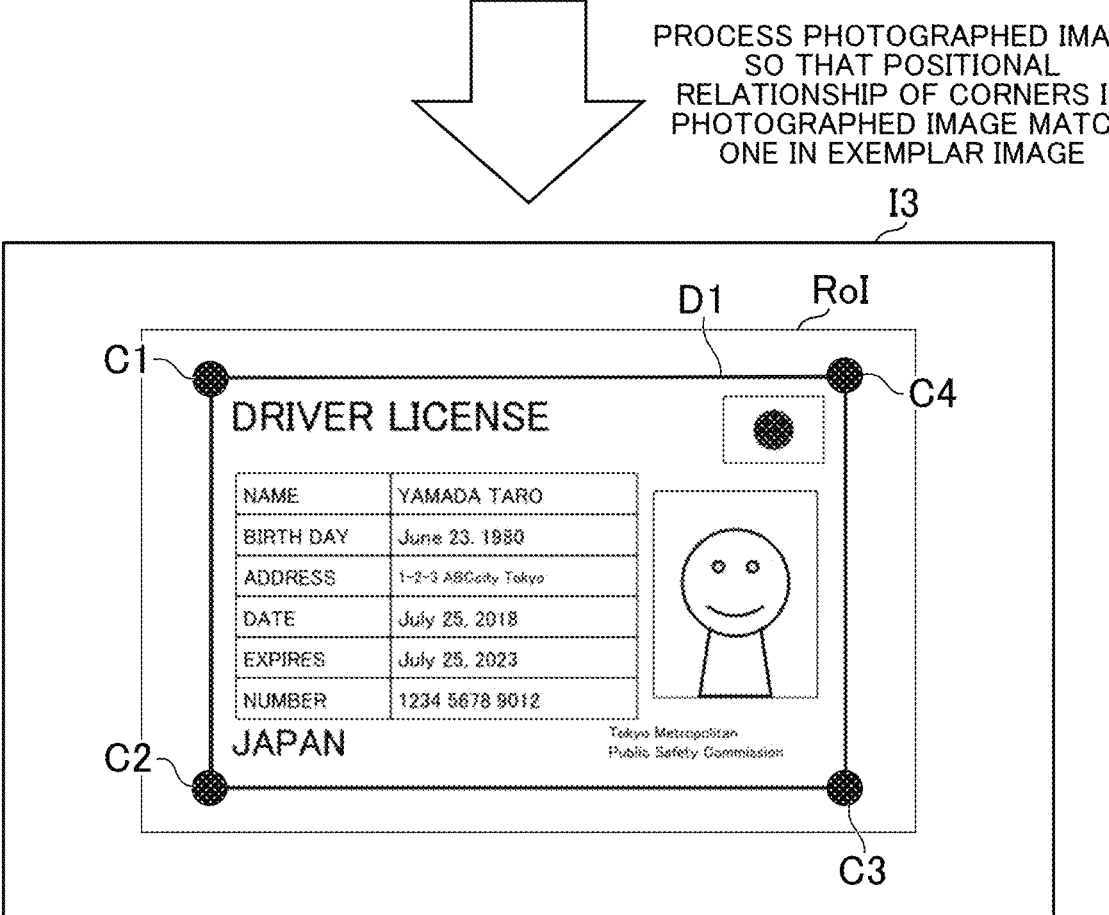

FIG. 9 and FIG. 10 are diagrams for illustrating an example of the processing executed by the processing module 105. In this embodiment, the processing module 105 executes the processing with the use of an exemplar image I2 of FIG. 9. The exemplar image I2 is an image including the predetermined outline described above. Accordingly, an image suitable for ekYC can be obtained through the processing in which the outline of the driver's license D1 included in the photographed image I1 is matched or approximated to an outline of a driver's license D2 included in the exemplar image I2.

The exemplar image I2 of FIG. 9 is an image created by photographing the driver's license D2, which is a sample, at a predetermined distance from a frontal direction. The driver's license D2 is of a person different from the owner of the driver's license D1, which is a target object, but is the same as the driver's license D1 in the standard part in principle. The standard part of the driver's license D1 and the standard part of the driver's license D2 may differ from each other, but the outline of the driver's license D1 and the outline of the driver's license D2 are the same or similar to each other. Being similar here means that a difference between the outlines is less than a predetermined value. For example, a difference in vertical length, a difference in horizontal length, a difference in corner position, or a combination of a plurality of differences out of those differences being less than a predetermined value means that the outlines are similar to each other.

For example, the processing by the line segment detection module 102 and the processing by the information acquisition module 103 are executed for the exemplar image I2 to detect corners C5 to C8, which serve as exemplars. The corners C5 to C8 may manually be specified by the administrator of the service, or may be detected by another type of image processing. Information by which positions of the corners C5 to C8 can be identified is stored in the data storage unit 100 in advance. This information is, for example, coordinates of the corners C5 to C8.

The processing module 105 processes at least a part of the photographed image I1 so that a positional relationship between the plurality of corners C1 to C4 matches or approximates a predetermined positional relationship, based on the corner information acquired by the information acquisition module 103. The predetermined positional relationship is an ideal positional relationship. A positional relationship of the corners C5 to C8 is an example of the predetermined positional relationship. When the user is demanded to photograph the driver's license D1 intentionally tilted, the predetermined positional relationship is a positional relationship of the corners that is observed when the driver's license D1 is photographed with the positional relationship between the driver's license D1 and the photographing unit 16 matching the predetermined positional relationship.

To match the predetermined positional relationship means that a positional relationship after image processing is a match with the predetermined positional relationship. To approximate the predetermined positional relationship means that, although the positional relationship after the image processing and the predetermined positional relationship do not match, a gap between the positional relationship after the image processing and the predetermined positional relationship is smaller than a gap between a positional relationship before the image processing and the predetermined positional relationship. As in FIG. 10, the processing module 105 performs, for example, affine transform on the photographed image I1 so that the positional relationship of the corners C1 to C4 approximates the positional relationship of the corners C5 to C8. Other than affine transform, any conversion processing including projection transform is usable. In this embodiment, the photographed image after the processing is denoted by a reference symbol "I3."

In this embodiment, the processing module 105 processes at least a part of the photographed image I1 when it is not determined that at least one of the corners C is outside the region of interest RoI. That is, the processing module 105 processes at least a part of the photographed image I1 when it is not determined that all of the corners C are inside the region of interest RoI. The processing module 105 accordingly does not execute the processing of at least a part of the photographed image I1 when it is determined that at least one of the corners C is outside the region of interest RoI.

The processing module 105 may execute the processing based on, instead of the corner information, another type of information acquired by the information acquisition module 103. For example, instead of the corner information, an outline of a rectangle formed from intersection points of line segments that are extensions of the line segments L1 to L4 may be used as information about the outline of the driver's license D1. In this case, the processing module 105 may process at least a part of the photographed image I1 so that a rectangle corresponding to the driver's license D1 matches or approximates a rectangle corresponding to the driver's license D2. To give another example, when the detected line segments L1 to L4 are long enough, the processing by the processing module 105 may be executed by skipping identification of the corners C and acquiring information that indicates the line segments L1 to L4 as information about the outline.

Matching Execution Module

The functions described above are main functions of the first configuration. Functions described below are mainly functions of the second configuration. The matching execution module 106 executes matching for the photographed image I3, based on the template image, which includes features about the driver's license D1. The features about the driver's license D1 are visual features of the entirety of or a part of the driver's license D1. For example, the features about the driver's license D1 are features of an image (for example, a background, a character, a number, a symbol, a graphic form, a table, a photograph, a pattern, or a hologram) formed in the driver's license D1. The features of an image is an outline, a color, a luminance, or a combination of those.

The template image is an image including features that serve as exemplars. In this embodiment, the standard part of the driver's license D1 is used as features, and the features included in the template image are accordingly this standard part. When a plurality of standard parts are used in the matching, the template image is prepared for each standard part. The template image is stored in advance in the data storage unit 100. In this embodiment, a part of the exemplar image I2 of FIG. 9 is used as the template image. Publicly known matching method is usable for the matching itself. The matching may also be called "template matching" or "pattern matching."

Figure 11:
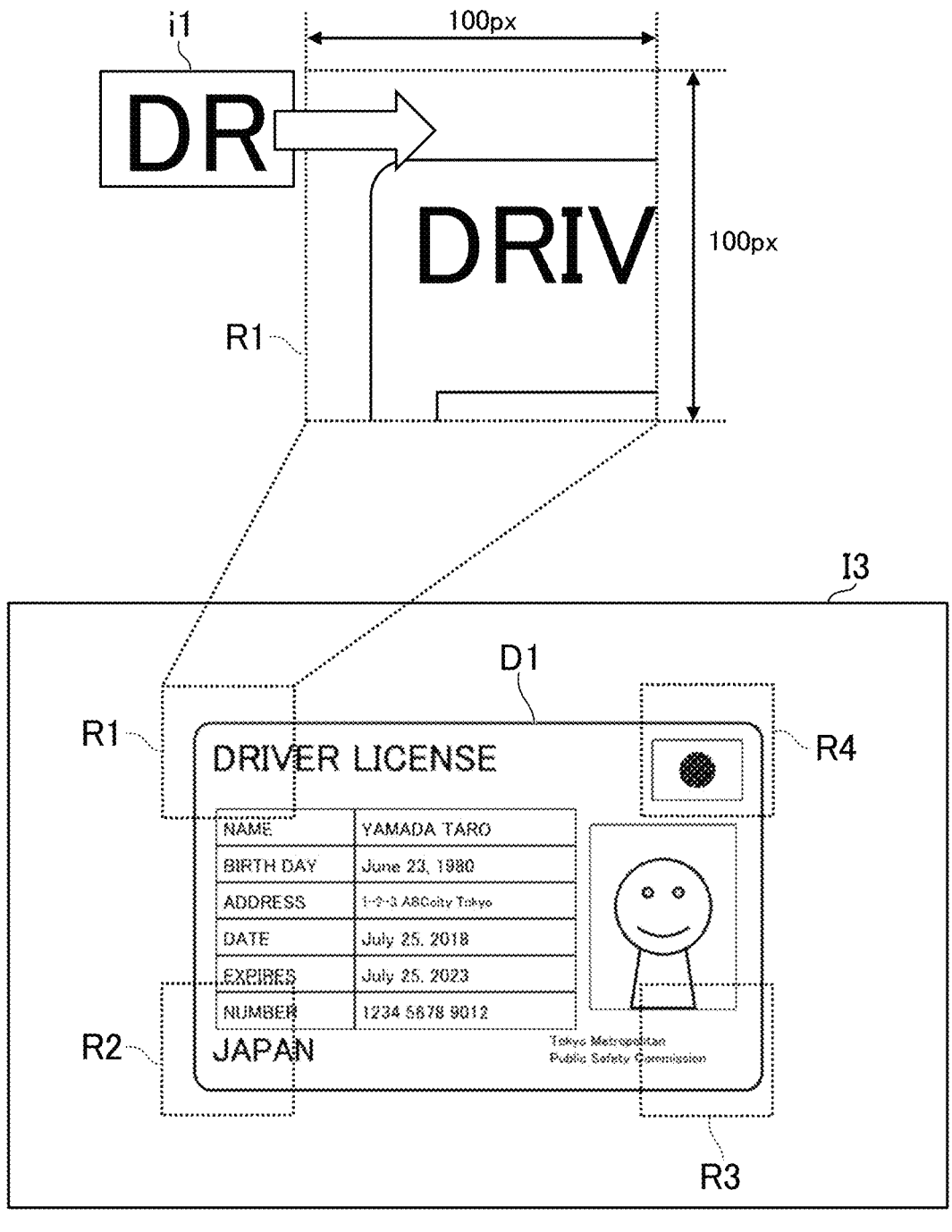
FIG. 11 is a diagram for illustrating an example of processing executed by a matching execution module.
Figure 12:
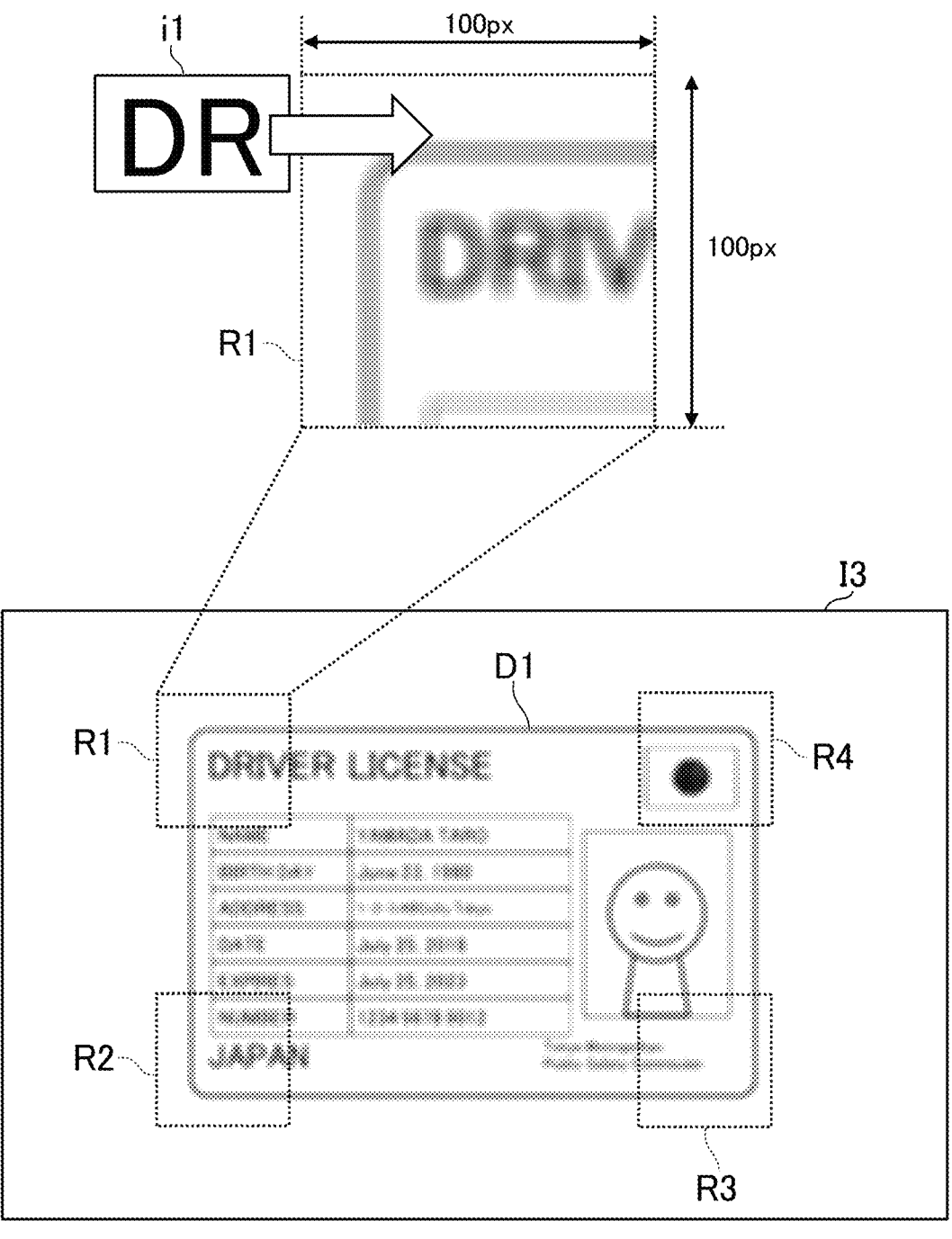
FIG. 12 is a diagram for illustrating the example of the processing executed by the matching execution module.

FIG. 11 and FIG. 12 are diagrams for illustrating an example of processing executed by the matching execution module 106. FIG. 11 is illustration of a case in which the driver's license D1 in the photographed image I3 is clear, and FIG. 12 is illustration of a case in which the driver's license D1 in the photographed image I3 is blurred. As in FIG. 11 and FIG. 12, the matching execution module 106 executes the matching for regions R1 to R4 near the corners C1 to C4 of the driver's license D1 in the photographed image I3. In the following description, the regions R1 to R4 are simply referred to as "regions R" when distinction between one region and another region is not required.

One of the regions R that is near the corner C is a region including the corner C, or a region that does not include the corner C but is within a predetermined distance from the corner C. In the example of FIG. 11 and FIG. 12, the regions R are each sized 100 pixels×100 pixels, but may be in any size and any shape. In FIG. 11 and FIG. 12, the matching for the region R1 near the corner C1 is taken as an example, and the same manner of matching is executed for the regions R2 to R4, which are near the corners C2 to C4, respectively.

For example, the matching execution module 106 acquires a template image i1 associated with the region R1 from the data storage unit 100. The template image i1 in this embodiment is smaller than the region R1. However, the template image i1 and the region R1 may have the same size. The matching execution module 106 moves the template image i1 about in the region R1 to calculate a score corresponding to a current position in the region R1.

The score indicates the degree of similarity to the standard part included in the template image i1. In the example of FIG. 11 and FIG. 12, the standard part is a character string "DR." The score can be expressed in a vector format or any other format. The score can be calculated by a calculation formula used in publicly known matching. In this embodiment, a case in which the matching execution module 106 calculates the score based on the sum of squared differences (SSD) is described. The matching execution module 106, however, may calculate the score based on sum of absolute differences (SAD) or any other method.

In this embodiment, a case in which a high numerical value indicated by the score means similarity to the template image i1 is described. When SAD or a similar calculation method is used, however, a low numerical value indicated by the score may mean similarity to the template image i1. For example, it is assumed that the region R1 is sized 100 pixels×100 pixels, and that the template image i1 is sized 10 pixels×10 pixels (although the template image i1 is a rectangle in FIG. 11, the template image i1 is described here as a square for the purpose of simplifying the description). In this case, when the template image i1 is moved by one pixel at a time, the matching execution module 106 acquires 90×90 scores. A sliding width (an amount of movement of the template image i1 at a time) in the matching is not limited to one pixel, and may be any number of pixels.

In the same manner, the matching execution module 106 executes the matching for the regions R2 to R4 near the corners C2 to C4. For example, the matching execution module 106 acquires template images i2 to i4 associated with the regions R2 to R4, respectively, from the data storage unit 100. The execution module 106 moves the template images i2 to i4 around in the regions R2 to R4, respectively, to calculate a score corresponding to each position. In the following description, the template images i1 to i4 are simply referred to as "template images i" when distinction between one template image and another template image is not required. It is sufficient for the matching execution module 106 to execute the matching for each of the template images "i".

In this embodiment, the matching is executed after the processing by the processing module 105 is executed. The matching execution module 106 accordingly executes the matching for the photographed image I3 which has been processed at least partially. In this embodiment, images generated in succession as the photographed image I1 are processed, with the result that processed images are acquired in succession as the photographed image I3. The matching execution module 106 accordingly executes the matching for each of the successive images of the photographed image I3. However, the photographed image I3, which is a processed image, is not acquired for the photographed image I1 in which one of the corners C is outside the region of interest RoI, and the matching is not executed in that case.

Highest Score Determination Module

The highest score determination module 107 determines whether the highest score out of a plurality scores is less than a threshold value. The highest score is a score indicating the highest degree of similarity out of scores calculated by the matching execution module 106. The highest score is high when the driver's license D1 is clear as in FIG. 11, and is low when the driver's license D1 is blurred as in FIG. 12. The highest score is low also when the photographed object is something other than the driver's license D1 that resembles the driver's license D1 in terms of outline. To give another example, the highest score is low when the back of the driver's license D1 is photographed.

The threshold value may be common to all of the regions R, or may be determined for each of the regions R separately. However, when this threshold value is set too high, the rate of success of eKYC drops, with the result that user friendliness is impaired. The threshold value is accordingly set to not too high a value (for example, from about 70% to about 90% of the theoretical highest score at which a complete match with the relevant one of the template images "i" is observed). Consequently, when the driver's license D1 is blurred as in FIG. 12 but the blurring is not so severe, the highest score reaches the threshold value or higher in some cases. The highest score reaches the threshold value or higher also when the photographed object is something that is not the driver's license D1 but resembles the driver's license D1 in color, pattern, or the like.

In this embodiment, the matching is executed for the plurality of regions R, and the highest score determination module 107 accordingly determines, for each one of the regions R, whether the highest score of the one of the regions R is less than the threshold value. For example, the highest score of one of the regions R is given as $S_{max}$ and the threshold value of the one of the regions R is given as $Th_{tm}$. The highest score determination module 107 acquires the highest score $S_{max}$ for each of the regions R. The highest score determination module 107 determines, for each of the regions R, whether the highest score $S_{max}$ is less than the threshold value $Th_{tm}$. The photographed image I3 in which the highest score $S_{max}$ is less than the threshold value Them as in Expression 1 is filtered out and does not receive processing of the blurring determination module described later.

$$S_{max} < Th_{tm} \qquad \text{[Expression 1]}$$

Distance Determination Module

The distance determination module 108 determines whether a distance between a position at which the highest score out of a plurality of scores is acquired and a position at which a feature illustrated in the relevant one of the template images "i" is supposed to be located is less than a threshold value. Information usable to identify the position at which a feature illustrated in the relevant one of the template images "i" is supposed to be located is stored in advance in the data storage unit 100. In this embodiment, a case in which the position at which a feature illustrated in the relevant one of the template images "i" is supposed to be located is a center point (in an example of FIG. 13, a center point in an area of 100 pixels×100 pixels) of each one of the regions R is described. This position, however, may be any point inside one of the regions R for which the matching is executed. The threshold value may be common to all of the regions R or may be determined for each of the regions R separately.

Figure 13:
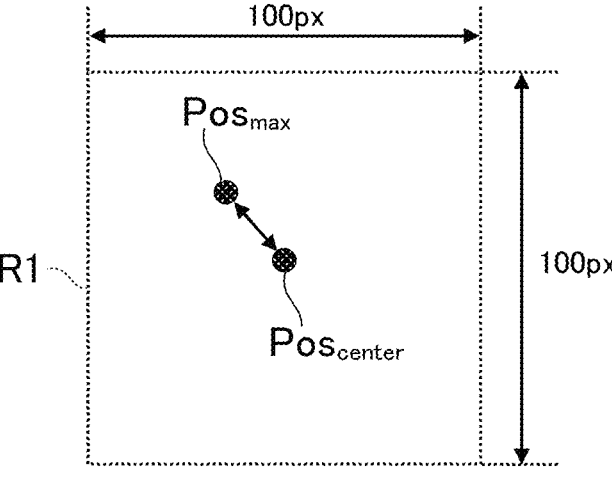
FIG. 13 is a diagram for illustrating an example of processing executed by a distance determination module.

FIG. 13 is a diagram for illustrating an example of processing executed by the distance determination module 108. In this embodiment, the matching is executed for the plurality of regions R, and the distance determination module 108 accordingly determines, for each of the regions R, whether the distance between the position at which the highest score out of a plurality of scores is acquired and the position at which a feature illustrated in the relevant one of the template images "i" is supposed to be located is less than the threshold value. For example, a position at which the highest score of one of the regions R is acquired is given as $Pos_{max}$, and a position in the one of the regions R at which a feature illustrated in the relevant one of the template images "i" is supposed to be located is given as $Pos_{center}$. The distance determination module 108 determines, for each of the regions R, whether a distance between the position $Pos_{max}$ and the position $Pos_{center}$ is less than a threshold value $Th_{dist}$. When the distance between the position $Pos_{max}$ and the position $Pos_{center}$ is greater than the threshold value $Th_{dist}$ as in Expression 2, the photographed image I3 is filtered out and does not receive processing of the blurring determination module described later.

$$|Pos_{max} - Pos_{center}| > Th_{dist} \qquad \text{[Expression 2]}$$

Analysis Module

The analysis module 109 analyzes a plurality of scores acquired through the matching. In this embodiment, images generated in succession as the photographed image I1 are processed, with the result that processed images are acquired in succession as the photographed image I3, and the analysis module 109 accordingly analyzes the plurality of scores for each of the successive images of the photographed image I3. The scores may be analyzed by any method. In this embodiment, a case in which dispersion analysis is used is described. In dispersion analysis, the degree of dispersion (the degree of bias) of the plurality of scores is analyzed. That is, the magnitude of a difference between individual scores is analyzed. Publicly known algorithms are usable for the dispersion analysis. For example, an algorithm called js-STAR or AIST-ANOVA may be used.

Figure 14:
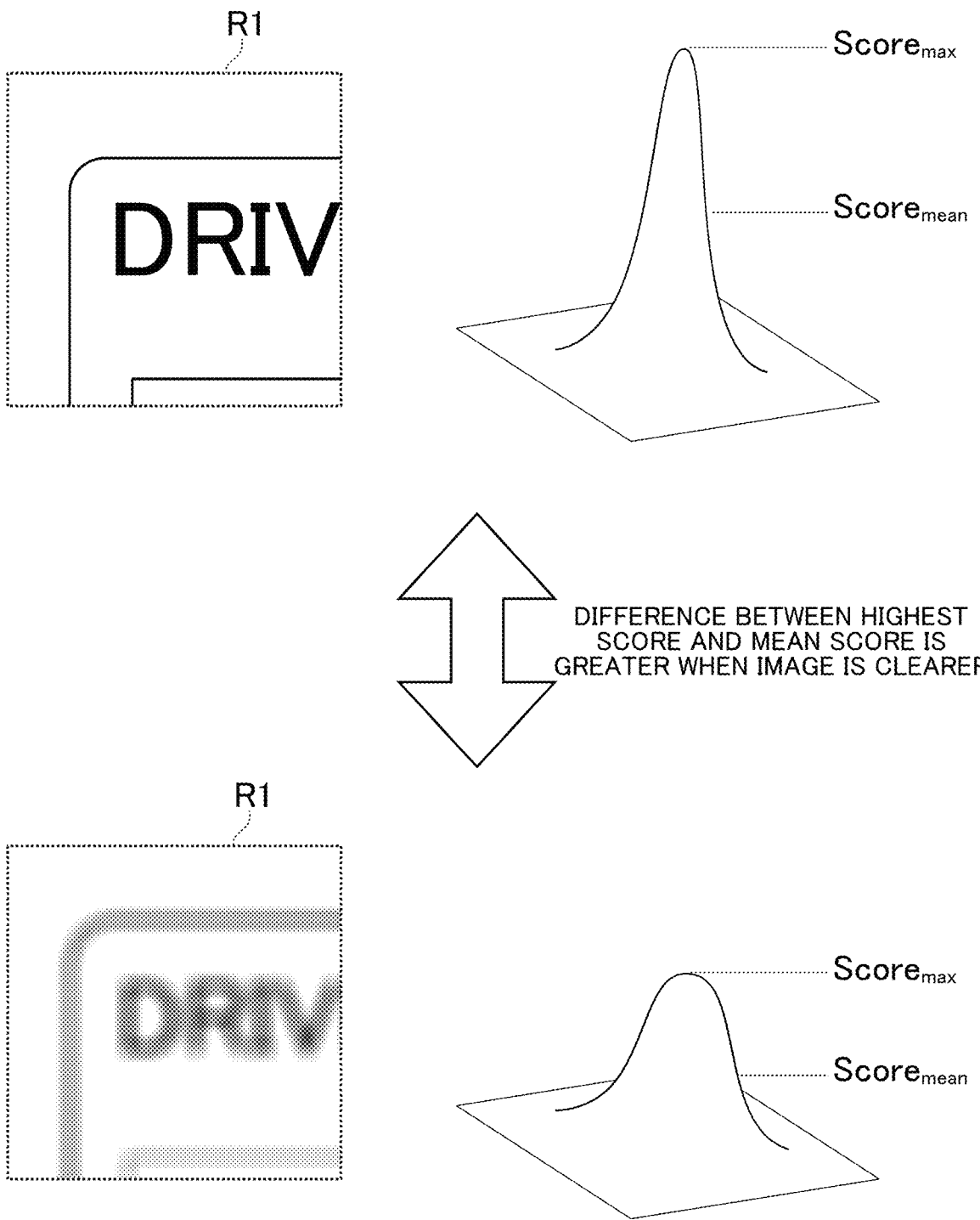
FIG. 14 is a diagram for illustrating an example of processing executed by an analysis module.

FIG. 14 is a diagram for illustrating an example of processing executed by the analysis module 109. In FIG. 14, analysis of scores acquired through the matching for the region R1 near the corner C1 is taken as an example. The analysis module 109 analyzes the plurality of scores based on, for example, the highest score out of the plurality of scores and a means score calculated from the plurality of scores. The mean score is given as, for example, $S_{mean}$. The analysis module 109 analyzes the plurality of scores by calculating a value that is a quotient of division of the highest score $S_{max}$ by the mean score $S_{mean}$, based on Expression 3.

$$\frac{\sum (S_{max} / S_{mean})}{N} < Th_{ratio} \qquad \text{[Expression 3]}$$

In this embodiment, a plurality of template images "i" are used, and the analysis module 109 accordingly analyzes a plurality of scores acquired for each of the template images "i". Contents of processing of the analysis for each of the template images "i" are as described above. That is, the analysis module 109 calculates a value that is a quotient of division of the highest score $S_{max}$ by the mean score $S_{mean}$ for the regions R2 to R4 associated with the corners C2 to C4 as well, in the same manner as the calculation for the region R1. The analysis module 109 executes the analysis by calculating a value of the left side of Expression 3. In Expression 3, N is a natural number indicating the number of the regions R, and is 4 in this embodiment. A comparison to a threshold value $Th_{ratio}$ in Expression 3 is executed by the blurring determination module 110.

As described above, the analysis module 109 in this embodiment calculates one index based on a plurality of scores acquired for each of the template images "i", to thereby analyze the plurality of scores. This index is the left side of Expression 3. This index is not limited to the example of Expression 3, and can be any index as long as analysis results of a plurality of scores acquired from a plurality of template images "i" can be integrated into one. For example, the index may be a mean value of four highest scores, or a mean value of four mean scores. Instead of the ratio of the highest score and the mean score as in Expression 3, a difference between the highest score and the mean score may be used. In this case, a mean value of four differences associated with the four corners C may be used as one index.

Blurring Determination Module

The blurring determination module 110 determines whether the driver's license D1 in the photographed image I3 is blurred based on a result of executing the analysis by the analysis module 109. In this embodiment, images generated in succession as the photographed image I1 are processed, with the result that processed images are acquired in succession as the photographed image I3, and the blurring determination module 110 accordingly determines, for each of the successive images of the photographed image I3, whether the driver's license D1 in the photographed image I3 is blurred. The blurring determination module 110 determines, based on Expression 3, whether the index (the left side of Expression 3) calculated by the analysis module 109 is less than the threshold value $Th_{ratio}$. This index being less than the threshold value $Th_{ratio}$ means that the driver's license D1 is blurred. This index being equal to or more than the threshold value $Th_{ratio}$ means that the driver's license D1 is not blurred. The photographed image I3 that satisfies Expression 3 is filtered out and is not transmitted to the server 20. The photographed image I3 that does not satisfy Expression 3 is transmitted to the server 20.

Transmission Module

The transmission module 111 transmits the photographed image I3 processed at least partially to the server 20. For example, the transmission module 111 transmits, to the server 20, the photographed image I3 determined to be unblurred. In this embodiment, the determination by the highest score determination module 107 and the determination by the distance determination module 108 are executed as well, and the accordingly transmission module 111 transmits the photographed image I3 based on the result of the determination by the highest score determination module 107, the result of the determination by the distance determination module 108, and the result of the determination by the blurring determination module 110. In this embodiment, filtering is executed with the use of Expression 1 to Expression 3, and the transmission module 111 accordingly transmits the photographed image I3 that fits none of Expression 1 to Expression 3.

3-2. Functions Implemented on Server

A data storage unit 200 is implemented mainly by the storage unit 22. Other functions of the server 20 are implemented mainly by the control unit 21.

Data Storage Unit

The data storage unit 200 stores data required for image processing. For example, the data storage unit 200 stores a user database and a template image database. The user database is a database storing information about a user. For example, the user database stores a user ID, a name, the photographed image I3, and an identity verification result. The template image database is a database storing information about the template images "i". For example, the template image database stores the exemplar image 12, the type of an identity verification document, and the template images "i". In ekYC, any identity verification document is usable, and the template images "i" suitable for an identity verification document selected by the user are accordingly transmitted to the user terminal 10.

Reception Module

A reception module 201 receives the photographed image I3 processed at least partially from the user terminal 10. For example, the photographed image I3 determined to be unblurred is received from the user terminal 10. In this embodiment, filtering is executed with the use of Expression 1 to Expression 3, and the reception module 201 accordingly receives the photographed image I3 that fits none of Expression 1 to Expression 3. The reception module 201 stores the received photographed image I3 in the user database.

Driver's License Determination Module

A driver's license determination module 202 determines, based on the photographed image I3 processed at least partially, whether the target object shown in the photographed image I3 is the predetermined driver's license D1. The driver's license determination module 202 determines whether the target object shown in the photographed image I3 is the predetermined driver's license D1, based on the photographed image I3 determined to be unblurred. For example, the driver's license determination module 202 may execute matching for the photographed image I3 with the use of more template images than the template images "i" used by the user terminal 10. The driver's license determination module 202 may also use, for example, a learning model in which various patterns of driver's licenses are learned by a machine learning method, to determine whether the driver's license D1 is included in the photographed image I3. For example, the driver's license determination module 202 may execute optical character recognition for the photographed image I3 to extract the user's name or another character string from the photographed image I3.

Demand Module

A demand module 203 demands, when it is determined that the illustrated target object is not the predetermined driver's license D1, that the user terminal 10 acquire the photographed image I3 again. It is sufficient for this demand to take a form that can display some message, for example, notification on an app, a push notification, an electronic mail, an SMS, or an SNS. This demand is not required to be visually recognizable to the user. When this demand is received, the user terminal 10 acquires the photographed image I1 again.

4. Processing Executed in Image Processing System S

Figure 15:
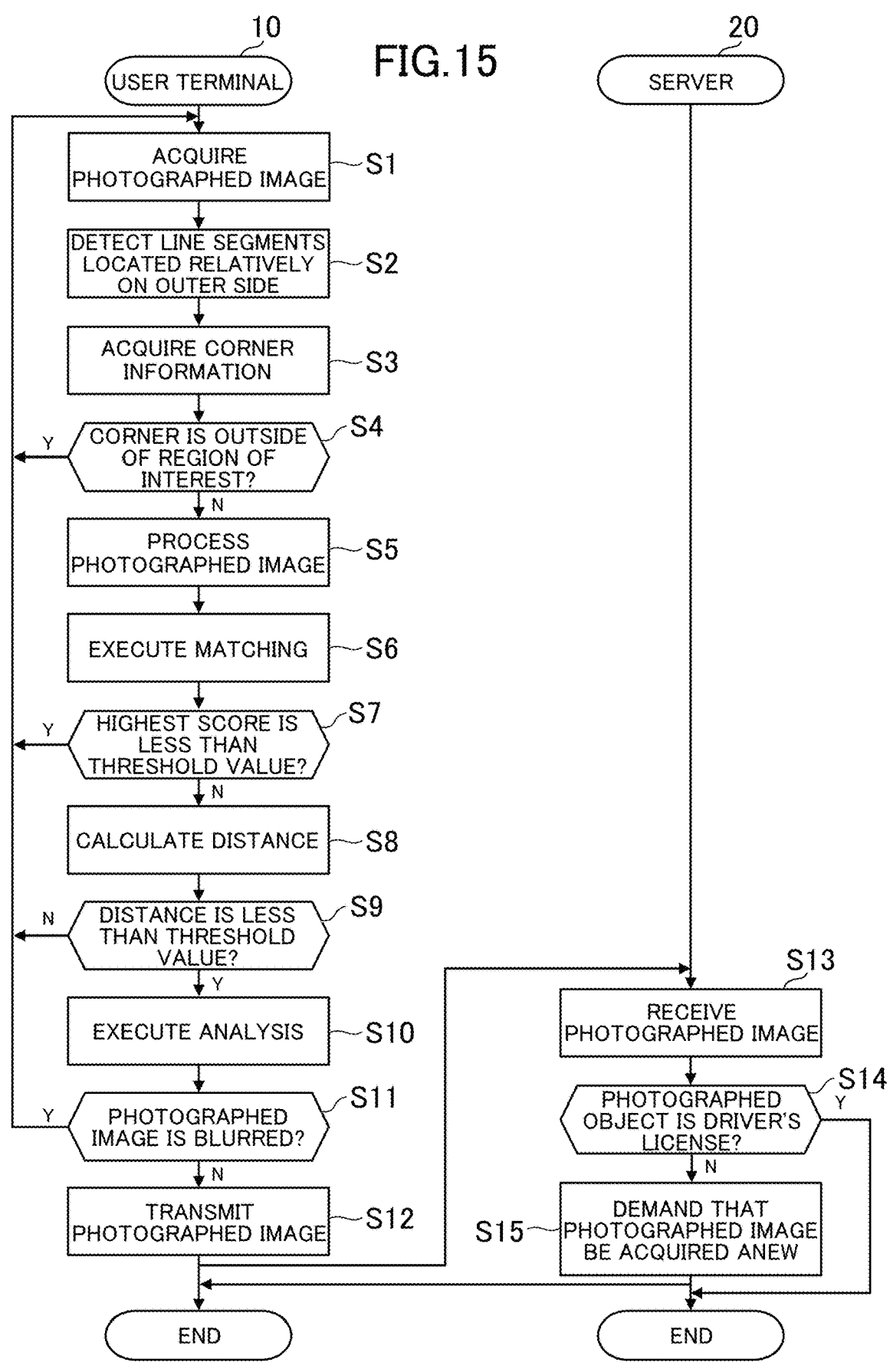
FIG. 15 is a flow chart for illustrating an example of processing executed in the image processing system.

FIG. 15 is a flow chart for illustrating an example of processing executed in the image processing system S. As in FIG. 15, the user terminal 10 acquires the photographed image I1 including the driver's license D1, based on a result of photographing by the photographing unit 16 (Step S1). The user terminal 10 detects, from the photographed image I1, based on the line segment detection processing, the line segments L located relatively on the outer side (Step S2). The user terminal 10 acquires the corner information indicating the positions of the corners C, based on the line segments L located relatively on the outer side (Step S3). The user terminal 10 determines whether at least one of the corners C is outside the region of interest RoI, based on the corner information (Step S4).

When it is determined that one of the corners C1 to C4 is outside the region of interest RoI (Step S4: "Y"), Step S5 and subsequent processing steps are not executed, and the process returns to Step S1. When it is not determined that one of the corners C1 to C4 is outside the region of interest RoI (Step S4: "N"), the user terminal 10 processes the photographed image I1 so that the positional relationship of the corners C1 to C4 in the photographed image I1 approximates the positional relationship of the corners C5 to C8 in the exemplar image 12 (Step S5).

The user terminal 10 executes, based on the template images "i", the matching for the photographed image I3 created through the processing in Step S5 (Step S6). The user terminal 10 determines whether the highest score is less than a threshold value for each of the regions R (Step S7). When it is determined that the highest score is less than the threshold value (Step S7: "Y"), Step and subsequent processing steps are not executed, and the process returns to Step S1. When it is determined that the highest score is equal to or more than the threshold value (Step S7: "N"), the user terminal 10 calculates a distance between the position at which the highest score is acquired from the photographed image I3 and the position at which a feature illustrated in the relevant one of the template images "i" is supposed to be located (Step S8).

The user terminal 10 determines, for each of the regions R, whether the distance calculated in Step S8 is less than a threshold value (Step S9). When it is not determined that the distance is less than the threshold value (Step S9: "N"), Step S10 and subsequent processing steps are not executed, and the process returns to Step S1. When it is determined that the distance is less than the threshold value (Step S9: "N"), the user terminal 10 executes analysis (Step S10).

The user terminal 10 determines whether the photographed image I3 is blurred, based on a result of the analysis in Step S10 (Step S11). When it is determined that the photographed image I3 is blurred (Step S11: "Y"), Step S12 and subsequent processing steps are not executed, and the process returns to Step S1. When it is not determined that the photographed image I3 is blurred (Step S11: "N"), the user terminal 10 transmits the processed photographed image I3 to the server 20 (Step S12).

The server 20 receives the processed photographed image I3 from the user terminal 10 (Step S13). The server 20 determines whether a driver's license is captured in the photographed image I3, with the use of more detailed matching or a machine learning method (Step S14). When it is not determined that a driver's license is captured (Step S14: "N"), the server 20 demands that the user terminal 10 acquire the photographed image I3 anew (Step S15). In this case, the user terminal 10 executes Step S1 and subsequent processing steps again. When it is determined that a driver's license is captured (Step S14: "Y"), this processing is ended. In this case, ekYC is executed based on the photographed image I3 transmitted to the server 20.

[Summary of First Configuration]

According to the first configuration of the image processing system S, the information about the outline of the driver's license D1 in the photographed image I1 is acquired based on the plurality of line segments L1 to L4 located relatively on the outer side (that is, the line segments L highly likely to be the driver's license D1). In the first configuration, at least a part of the photographed image I1 is processed based on this information so that this outline matches or approximates a predetermined outline. This eliminates the need to execute image processing with a large amount of calculation, such as extraction of groups of feature points, and accordingly lightens processing load on the user terminal 10. That is, the processing load on the user terminal 10 can be lightened because it suffices to execute image processing in which the line segments L are detected instead of groups of feature points and, accordingly, the amount of calculation is relatively small. Quick image processing of the photographed image I1 is accomplished by lightening the processing load on the user terminal 10. The photographed image I3 which is a processed image can accordingly be acquired in a short time. Acquisition of the photographed image I3 which is a processed image in a short time is accomplished even when, for example, the user terminal 10 is a smartphone or another terminal that has low processing power compared to a personal computer.

In the first configuration, the processing load on the user terminal 10 can be lightened more effectively by processing at least a part of the photographed image I1 so that the positional relationship of the plurality of corners C matches or approximates a predetermined positional relationship, based on the corner information. For example, the amount of calculation is greatly reduced because it is not required to pay attention to groups of many feature points, and it suffices to pay attention to only the four corners C. Attention to the corners C also enhances precision of processing when the corners C are important target objects in terms of the shape of the outline as is the case with the driver's license D1.

In the first configuration, the corner information can be acquired through simpler processing by extending at least one of the plurality of line segments L and thus deducing the positions of the plurality of corners C. With the reduction in the amount of calculation required to acquire the corner information, the processing load on the user terminal 10 can be lightened more effectively.

In the first configuration, a region that is a target of the line segment detection processing is reduced in size by detecting the plurality of line segments L that are located relatively on the outer side in the region of interest RoI of the photographed image I1. This eliminates detection of the line segments L that are irrelevant, and the processing load on the user terminal 10 can accordingly be lightened more effectively. For example, guiding of the region of interest RoI by the user terminal 10 enables the user to better understand how the driver's license D1 is to be photographed. Further, in practice, another object is photographed in the background of the driver's license D1. In the example of FIG. 4, the driver's license D1 placed on a table is photographed and, consequently, a pattern on the table actually shows as the background of the photographed image I1. There is a possibility that the line segments L that represent the patterns on the table are accidentally detected, but the possibility of detection of the line segments L that represent the background is decreased by setting the inside of the region of interest RoI as a target of the processing.

In the first configuration, the plurality of line segments L that are included in the region of interest RoI at both ends and that are located relatively on the outer side in the region of interest RoI are detected, to thereby detect the line segments L that are useful in the processing of the photographed image I1 and thus enhance the precision of processing. For example, the line segments L that indicate the outline of the driver's license D1 are relatively long and located relatively on the outer side in the region of interest RoI, and detection of those line segments L accordingly enables execution of processing of the photographed image I1 that is based on the line segments L highly likely to be the outline, with the result that the precision of processing is enhanced.

In the first configuration, a plurality of line segments that are each included, at both ends, within a predetermined distance from at least one edge part of the region of interest RoI, and that are located relatively on the outer side in the region of interest RoI are detected, to thereby detect the line segments L that are useful in the processing of the photographed image I1 and thus enhance the precision of processing. For example, the line segments L that indicate the outline of the driver's license D1 are each included, at both ends, within the predetermined distance from an edge part of the region of interest RoI, and are also located relatively on the outer side in the region of interest RoI, and detection of those line segments L accordingly enables execution of processing of the photographed image I1 that is based on the line segments L highly likely to be the outline, with the result that the precision of processing is enhanced.

In the first configuration, at least a part of the photographed image I1 is processed when it is not determined that at least one of the corners of the driver's license D1 is outside the region of interest RoI, and the photographed image I1 receptive to highly precise processing can thus be processed. The precision of processing is accordingly enhanced. When the driver's license D1 in the photographed image I1 is greatly distorted and it is difficult to process with high precision, the processing is not executed, and execution of unrequired processing is accordingly eliminated. The processing load on the user terminal 10 can thus be lightened.

In the first configuration, for each edge part of the region of interest RoI, one of the line segments L that is closest to that edge part is detected, to thereby detect the line segments L that are useful in the processing of the photographed image I1 and thus enhance the precision of processing. For example, the line segments L closest to the edge parts of the region of interest RoI are highly likely to be the line segments that indicate the outline of the driver's license D1, and detection of those line segments L accordingly enables execution of processing of the photographed image I1 that is based on the line segments L highly likely to be the outline, with the result that the precision of processing is enhanced.

In the first configuration, the plurality of line segments L that are relatively long and that are located relatively on the outer side are detected, to thereby detect the line segments L that are useful in the processing of the photographed image I1 and thus enhance the precision of processing. For example, the line segments L that indicate the outline of the driver's license D1 are highly likely to be relatively long and located relatively on the outer side, and detection of those line segments L accordingly enables execution of processing of the photographed image I1 that is based on the line segments L highly likely to be the outline, with the result that the precision of processing is enhanced.

In the first configuration, whether a target object shown in the photographed image I3 is the predetermined driver's license D1 is determined based on the photographed image I3 processed at least partially, to thereby execute the determination processing after the photographed image is processed so as to reach a state in which whether the shown target object is the driver's license D1 is easy to determine. The precision of determination on whether the shown target object is the driver's license D1 is accordingly enhanced. This also saves the trouble of starting over from the acquisition of the photographed image I1 due to a failure to determine whether the shown target object is the driver's license D1. As a result, both of the processing load on the user terminal 10 and processing load on the server 20 can be lightened.

In the first configuration, the user terminal 10 executes steps up through the processing of the photographed image I1 and the server 20 determines whether the target object shown in the photographed image I3 is the predetermined driver's license D1, to thereby divide image processing and thus lighten both of the processing load on the user terminal 10 and the processing load on the server 20.

In the first configuration, image processing is executed for the photographed image I1 that is acquired as images generated in succession, and continuous image processing can thus be executed until execution of optimum processing is accomplished. As a result, the trouble of generating one still image at a time is saved, and user friendliness is accordingly enhanced. In addition, although resolution in the video function is often lower than resolution in the camera function, processing of the photographed image I1 can accurately be executed even when the photographed image I1 has a low resolution.

Summary of Second Configuration

According to the second configuration of the image processing system S, whether the driver's license D1 in the photographed image I3 is blurred is determined based on the result of executing analysis about a plurality of scores acquired by the matching for the photographed image I3. This eliminates the need to execute image processing large in the amount of calculation, such as extraction of groups of feature points, and accordingly lightens processing load on the user terminal 10. That is, the processing load on the user terminal 10 is lightened because it suffices to execute image processing in which the matching instead of extraction of groups of feature points is executed and, accordingly, the amount of calculation is relatively small. Quick image processing of the photographed image I3 is accomplished by lightening the processing load on the user terminal 10. Whether the driver's license D1 in the photographed image I3 is blurred can accordingly be determined in a short time. For example, whether the driver's license D1 in the photographed image I3 is blurred can be determined in a short time even when the user terminal 10 is a smartphone or another terminal that has low processing power compared to a personal computer.

In the second configuration, whether the driver's license D1 is blurred can be determined through simpler processing by utilizing scores that indicate the degrees of similarity to features included in the template images "i". With the reduction in the amount of calculation required to determine whether the driver's license D1 is blurred, the processing load on the user terminal 10 can be lightened more effectively.

In the second configuration, whether the driver's license D1 is blurred can be determined with the use of scores acquired from the plurality of regions R by executing analysis about a plurality of scores acquired for each of the template images "i". As a result, the precision of determination on whether the driver's license D1 is blurred is enhanced.

In the second configuration, whether the driver's license D1 is blurred can be determined through simpler processing by determining whether one index calculated from a plurality of scores acquired for each of the template images "i" is less than a threshold value. With the reduction in the amount of calculation required to determine whether the driver's license D1 is blurred, the processing load on the user terminal 10 can be lightened more effectively.

In the second configuration, execution of the matching for the regions R near the corners in which the matching is easy to execute is accomplished by executing the matching with the use of the standard parts placed near the corners of the driver's license D1. With the precision of the matching enhanced, the precision of determination on whether the driver's license D1 is blurred is enhanced as well.

In the second configuration, whether the driver's license D1 is blurred can be determined through simpler processing by executing analysis based on the highest score out of a plurality of scores and on a mean score calculated from the plurality of scores. The processing load on the user terminal 10 can accordingly be lightened more effectively.

In the second configuration, whether the driver's license D1 is blurred can be determined through simpler processing by executing analysis based on a value that is a quotient of division of the highest score by the mean score. The processing load on the user terminal 10 can accordingly be lightened more effectively.

In the second configuration, the photographed image I3 is transmitted to the server 20 based on the result of determining whether the highest score out of a plurality of scores is less than a threshold value and the result of determining whether the driver's license D1 is blurred, and transmission of the photographed image I3 that is unsuitable for ekYC can thus be prevented. For example, when a card or the like that resembles the driver's license D1 in terms of outline but is not a driver's license is photographed, the highest score is low, and the fact that the photographed object is such a card or the like can accordingly be detected.

In the second configuration, the photographed image I3 is transmitted to the server 20 based on the result of determining whether a distance between the position in the photographed image I3 at which the highest score is acquired and the position of a feature in a template image is less than a threshold value, and the result of determining whether the driver's license D1 is blurred. Transmission of the photographed image I3 that is unsuitable for ekYC can thus be prevented. For example, when a card or the like that resembles the driver's license D1 in terms of overall coloring but is not a driver's license is photographed, the highest score may be high to a certain degree, but the fact that the photographed object is such a card or the like can be detected because the distance described above tends to be long in that case.

In the second configuration, the precision of the matching is enhanced by executing the matching for the photographed image I3 that is created by processing in which the outline of the driver's license D1 in the photographed image I1 approximates a predetermined outline. That is, when the driver's license D1 is distorted, there is a fear in that the matching cannot normally be executed, but the precision of determination on whether the driver's license D1 is blurred is also enhanced by executing the matching after correcting the distortion of the driver's license D1.

In the second configuration, whether a target object shown in the photographed image I3 is the predetermined driver's license D1 is determined based on the photographed image I3, which is a processed image, to thereby execute the determination processing after the photographed image is processed so as to reach a state in which whether the shown target object is the driver's license D1 is easy to determine. The precision of determination on whether the shown target object is the driver's license D1 is accordingly enhanced. This also saves the trouble of starting over from the acquisition of the photographed image I1 due to a failure to determine whether the shown target object is the driver's license D1. As a result, both of the processing load on the user terminal 10 and processing load on the server 20 can be lightened.

In the second configuration, the user terminal 10 executes steps up through determination on whether the driver's license D1 is blurred, and the server 20 determines whether the target object shown in the photographed image I3 is the predetermined driver's license D1, to thereby divide the image processing and thus be able to lighten both of the processing load on the user terminal 10 and the processing load on the server 20.

In the second configuration, image processing is executed for the photographed image I3 that is acquired as images generated in succession, and continuous image processing can thus be executed until execution of optimum processing is accomplished. As a result, the trouble of generating one still image at a time is saved, and user friendliness is accordingly enhanced. In addition, although resolution in the video function is often lower than resolution in the camera function, determination on the photographed image I3 can accurately be executed even when the photographed image I3 has a low resolution.

5. Modification Examples

The present disclosure is not limited to the embodiment described above, and can be modified suitably without departing from the spirit of the present disclosure.

5-1. Modification Example Concerning First Configuration

Figure 16:
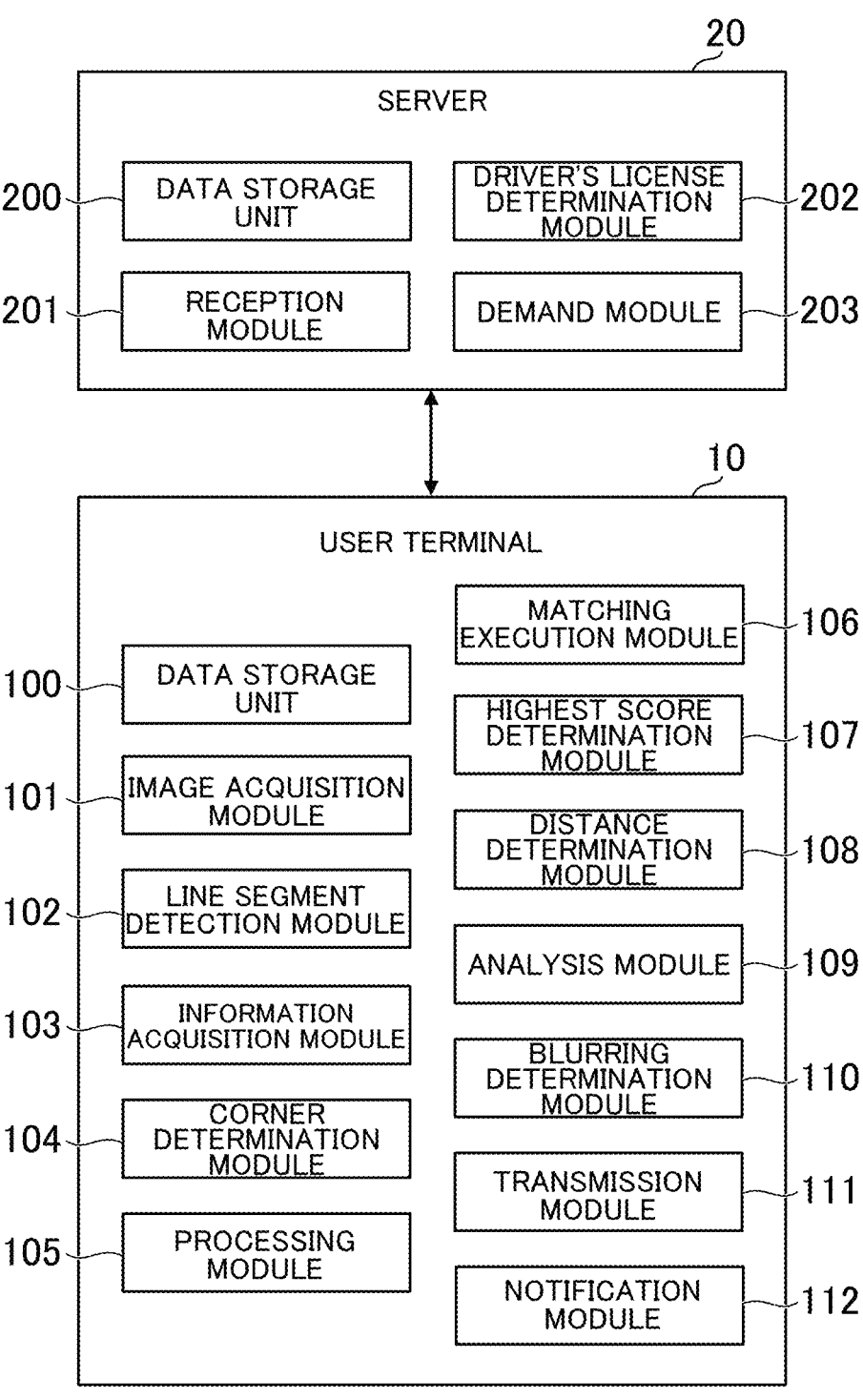
FIG. 16 is a function block diagram in a modification example concerning a first configuration.

FIG. 16 is a function block diagram in a modification example concerning the first configuration. The image processing system S of the modification example concerning the first configuration further includes a notification module 112 which notifies, when it is determined that at least one of the corners C is outside the region of interest RoI, a changing method for changing at least one of a position, a posture, or a direction of at least one of the driver's license D1 or the photographing unit 16, based on a positional relationship of the at least one of the corners C and the region of interest RoI.

The positional relationship described above is a direction of the at least one of the corners C that is outside the region of interest RoI in relation to the region of interest RoI. In the example of FIG. 8, one of the corners C is outside the lower right of the region of interest RoI, and the fact that the one of the corners C is outside the lower right of the region of interest RoI is accordingly identified as the positional relationship described above. The changing method described above may also be said as a changing method for changing a positional relationship between the driver's license D1 and the photographing unit 16. That is, the notification module 112 notifies a method of changing at least one of a photographing position or a photographing direction in photographing of the driver's license D1. The notification may be visual notification on the photographed image I1, or may be performed by audio.

In this modification example, the data storage unit 100 stores the positional relationship between the at least one of the corners C that is outside the region of interest RoI and the region of interest RoI, and the changing method to be notified by the notification module 112, in association with each other. The notification module 112 identifies the positional relationship between the at least one of the corners C that is outside the region of interest RoI and the region of interest RoI, based on the position of the at least one of the corners C and the position of the region of interest RoI. The notification module 112 notifies based on the changing method that is associated with the identified positional relationship.

For example, when one of the corners C is outside the lower right of the region of interest RoI as in FIG. 8, the notification module 112 may send a notification that the driver's license D1 is to be rotated to the left, or a notification that the photographing unit 16 is to be rotated to the right. The rotation helps to contain the driver's license D1 within the region of interest RoI. When at least one of the corners C is outside the region of interest RoI in another direction, the notification module 112 notifies, in the same manner, a changing method for changing at least one of the position, the posture, or the direction of at least one of the driver's license D1 or the photographing unit 16 so that the at least one of the corners C that is outside the region of interest RoI returns to the region of interest RoI.

According to this modification example, when it is determined that at least one of the corners C is outside the region of interest RoI, a changing method is notified to change at least one of the position, the posture, or the direction of at least one of the driver's license D1 or the photographing unit 16. This helps to contain the driver's license D1 within the region of interest RoI, and thus improves user friendliness.

The image processing system S may have the first configuration without including the second configuration. That is, the image processing system S is not always required to have both of the first configuration and the second configuration, and may have only one of the two. In this case, the matching is not required to be executed for the photographed image I3, which is a processed image. For example, the user terminal 10 may transmit the processed photographed image I3 as it is to the server 20, without executing the matching for the photographed image I3. Efficient eKYC is accomplished in this modification as well because, although whether the driver's license D1 is blurred is not determined, eKYC is executed based on the photographed image I3 in which the outline of the driver's license D1 is straightened.

5-2. Modification Example Concerning Second Configuration

In the embodiment, processing of transmitting the photographed image I3 to the server 20 is described as predetermined processing executed based on the result of determination by the blurring determination module 110. However, the predetermined processing can be any processing, and is not limited to the processing of transmitting the photographed image I3 to the server 20. For example, the predetermined processing may be processing of recording the photographed image I3 in the user terminal 10. To give another example, the predetermined processing may be processing of transmitting the photographed image I3 to a computer other than the server 20. The predetermined processing may also be processing of extracting the user's name or the like by executing optical character recognition for the photographed image I3.

Similarly, the predetermined processing may be executed based on the result of the determination by the highest score determination module 107 and the result of the determination by the blurring determination module 110. The predetermined processing may be executed based on the result of the determination by the distance determination module 108 and the result of the determination by the blurring determination module 110. That is, the predetermined processing may be executed when none of Expression 1 to Expression 3 applies.

The image processing system S may have the second configuration without including the first configuration. That is, the image processing system S is not always required to have both of the first configuration and the second configuration, and may have only one of the two. In this case, the matching may be executed without processing the photographed image I1. For example, the user terminal 10 may execute the matching for photographed image I1 as it is, without processing the photographed image I1. Efficient eKYC is accomplished in this modification as well because whether the driver's license D1 is blurred can be determined.

For example, the filtering condition of Expression 1 or Expression 2 may be omitted. For example, the condition for determining whether the driver's license D1 is blurred is not limited to the example of Expression 3. The blurring determination module 110 may determine whether the driver's license D1 is blurred by, for example, creating a probability distribution of scores and basing the determination on the height of a turning point in a graph of the probability distribution and the gradient of the graph. When the graph of the probability distribution is high in the height of the turning point and is steep in gradient, it means that a specific high score is locally found, and accordingly means that the driver's license D1 is clear. When the graph of the probability distribution is low in the height of the turning point and is gentle in gradient, on the other hand, it means that certain scores are evenly distributed throughout a wide range, and accordingly means that the driver's license D1 is blurred.

5-3. Other Modification Examples

For example, when it is determined that the driver's license D1 is not blurred, the frame borders of the region of interest RoI may change color. The user terminal 10 is not required to perform image processing on all of images generated in succession as the photographed image I1, and may execute image processing for only some of the images generated as the photographed image I1. For example, the image processing system S is applicable to any scenes other than eKYC. The image processing system S is applicable to, for example, a scene in which an obstacle is recognized in automatic driving of a vehicle or an airplane. The image processing system S is also applicable to, for example, a scene in which a bubble sheet test is scored. The image processing system S is applicable to any scene in which image processing is executed for a target object image including a target object to be recognized.

For example, although a case in which main processing is executed on the user terminal 10 is described in the embodiment, the processing described as processing to be executed on the user terminal 10 may be executed on the server 20. When the server 20 has the first configuration and the second configuration, the processing load on the server 20 can be lightened. For example, the user terminal 10 may have the first configuration and the server 20 may have the second configuration to divide processing between the user terminal 10 and the server 20. Conversely, the user terminal 10 may have the second configuration and the server 20 may have the first configuration to divide processing between the user terminal 10 and the server 20. When the processing is divided, the photographed image I3 and other types of data are to be transmitted appropriately between the user terminal 10 and the server 20.

The invention claimed is:

1. An image processing system, comprising at least one processor configured to:
acquire a target object image including a target object;
execute matching for a first region of pixels of the target object image based on a second region of pixels of a template image including a feature about the target object;
wherein the template image is clear;
analyze a plurality of scores indicating a degree of similarity between each pixel of the first region and the second region acquired through the matching;
determine whether the target object in the target object image is blurred, based on a result of the analysis of the plurality of scores;
not execute a further processing of the target image when the target object is determined to be blurred;
wherein four regions in each of the template image and the target image undergo execution matching;
wherein the at least one processor is configured to analyze the plurality of scores acquired for each of a plurality of template images by calculating one index based on the plurality of scores acquired for each template image; and wherein the at least one processor is configured to determine whether the target object in the target object image is blurred by comparing the index to a blur determination threshold.

2. The image processing system according to claim 1, wherein the target object includes one or more standard parts, wherein the feature included in the template image is the standard part, and wherein the plurality of scores each indicate a degree of similarity to the standard part included in the template image.

3. The image processing system according to claim 2, wherein the target image includes a plurality of the standard parts, wherein template images are prepared for each of the plurality of the standard parts, and wherein the at least one processor is configured to execute the matching for each template image.

4. The image processing system according to claim 2, wherein the standard part is placed near a corner of the target object, and wherein the at least one processor is configured to execute the matching for a region near the corner of the target object in the target object image.

5. The image processing system according to claim 1, wherein the at least one processor is configured to analyze the plurality of scores based on a highest score out of the plurality of scores and on a mean score calculated from the plurality of scores.

6. The image processing system according to claim 5, wherein the at least one processor is configured to analyze the plurality of scores based on a value that is a quotient of division of the highest score by the mean score.

7. The image processing system according to claim 1, wherein the at least one processor is configured to determine whether a highest score out of the plurality of scores is less than a threshold value, and wherein, based on a result of determination relating to the highest score and a result of determination relating to the blurring, predetermined processing is executed.

8. The image processing system according to claim 1, wherein the at least one processor is configured to determine whether a distance between a position at which a highest score out of the plurality of scores is acquired and a position at which the feature is supposed to be located is less than a threshold value, and wherein, based on a result of determination relating to the distance and a result of determination relating to the blurring, predetermined processing is executed.

9. The image processing system according to claim 1, wherein the at least one processor is configured to process at least a part of the target object image so that an outline of the target object in the target object image approximates a predetermined outline, and wherein the at least one processor is configured to execute the matching for the target object image processed at least partially.

10. The image processing system according to claim 1, wherein the at least one processor is configured to determine whether the target object is a predetermined target object based on the target object image determined to be unblurred.

11. The image processing system according to claim 10, further comprising a user terminal and a server, wherein the user terminal is configured to:
acquire the target object image;
execute the matching;

analyze the plurality of scores;

determine whether the target object is blurred; and transmit, to the server, the target object image determined to be unblurred, and wherein the server is configured to:

receive, from the user terminal, the target object image determined to be unblurred;

determine whether the target object is a predetermined target object; and demand, when it is determined that the target object is not the predetermined target object, that the user terminal acquire the target object image again.

12. The image processing system according to claim 1, wherein the target object is an identity verification document of a user, wherein the target object image is an image generated by a camera by photographing the identity verification document in succession, wherein the at least one processor is configured to:

acquire the images generated in succession as the target object image, execute the matching for each of the images generated in succession as the target object image, analyze the plurality of scores for each of the images generated in succession as the target object image, and determine, for each of the images generated in succession as the target object image, whether the identity verification document in the target object image is blurred.

13. The image processing system according to claim 1, wherein a number of scores of the plurality of scores is based on a first number of pixels in the first region and a second number of pixels in the second region.

14. The image processing system according to claim 13, wherein the number of pixels in the first region and the number of pixels in the second region are different.

15. The image processing system according to claim 1, wherein each of the regions of the four regions in the template image is located in one of four corners of the template image.

16. An image processing method, comprising:

acquiring a target object image including a target object;

executing matching for a first region of pixels the target object image based on a second region of pixels of a template image including a feature about the target object;

wherein the template image is clear;

analyzing a plurality of scores indicating a degree of similarity between each pixel of the first region and the second region acquired through the matching;

determining whether the target object in the target object image is blurred, based on a result of the analysis of the plurality of scores;

not execute a further processing of the target image when the target object is determined to be blurred;

wherein four regions in each of the template image and the target image undergo execution matching;

analyzing the plurality of scores acquired for each of a plurality of template images by calculating one index based on the plurality of scores acquired for each template image; and determining whether the target object in the target object image is blurred by comparing the index to a blur determination threshold.

17. A non-transitory computer-readable information storage medium for storing a program for causing a computer to:

acquire a target object image including a target object;

execute matching for a first region of pixels the target object image based on a second region of pixels of a template image including a feature about the target object;

wherein the template image is clear;

analyze a plurality of scores indicating a degree of similarity between each pixel of the first region and the second region acquired through the matching;

determine whether the target object in the target object image is blurred, based on a result of the analysis of the plurality of scores; and not execute a further processing of the target image when the target object is determined to be blurred;

wherein four regions in each of the template image and the target image undergo execution matching;

analyze the plurality of scores acquired for each of a plurality of template images by calculating one index based on the plurality of scores acquired for each template image; and determine whether the target object in the target object image is blurred by comparing the index to a blur determination threshold.

* * * * *